US012760174B2

(12) United States Patent
Oakdale et al.

(10) Patent No.: US 12,760,174 B2
(45) Date of Patent: Oct. 13, 2026

(54) ACTINIC AND THERMAL CURE FLUOROPOLYMERS WITH CONTROLLED POROSITY

(71) Applicant: Lawrence Livermore National Security, LLC, Livermore, CA (US)

(72) Inventors: James Oakdale, Castro Valley, CA (US); Sarah E. Baker, Dublin, CA (US); Nikola Dudukovic, Hayward, CA (US); Eric B. Duoss, Dublin, CA (US); Melinda Lia Wah Jue, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 834 days.

(21) Appl. No.: 17/006,462

(22) Filed: Aug. 28, 2020

(65) Prior Publication Data

US 2022/0064427 A1 Mar. 3, 2022

(51) Int. Cl.

*C08L 27/18* (2006.01)
*B29C 39/00* (2006.01)
*C08J 9/00* (2006.01)
*C08J 9/228* (2006.01)

(52) U.S. Cl.

CPC ............ *C08L 27/18* (2013.01); *B29C 39/003* (2013.01); *C08J 9/008* (2013.01); *C08J 9/228* (2013.01)

(58) Field of Classification Search

CPC ..... C08L 27/18; B29C 39/003; B29C 33/405; B29C 33/424; B29C 39/26; C08J 9/008; C08J 9/228; C08J 2201/026; C08J 2201/0502; C08J 2300/102; C08J 2333/16; C08J 9/26; C08J 9/28; B29K 2027/12; C09D 133/16; C08F 120/28

See application file for complete search history.

(56) References Cited

U.S. PATENT DOCUMENTS 6,015,609 A * 1/2000 Chaouk .................. B01D 71/32 528/495
2006/0217451 A1* 9/2006 Bonapersona ............ C08J 9/14 521/131
2013/0302598 A1* 11/2013 Haraguchi ........... C09D 133/14 522/39
2015/0126654 A1* 5/2015 Klun ........................ C09D 4/00 524/265

FOREIGN PATENT DOCUMENTS

EP 0711788 * 5/1996
EP 0711788 A2 * 5/1996 ................ C08F 8/00
JP 2015058419 A * 3/2015
WO WO-9735905 A1 * 10/1997 ............. B01D 67/00
WO WO-2016154171 A1 * 9/2016 .......... H01M 4/0407
WO 2018065094 A1 4/2018

OTHER PUBLICATIONS

Robbins, A., "What is the difference between ePTFE and sintered PTFE?," Porex Filtration Group, Dec. 13, 2019, 3 pages.
Liang et al., U.S. Appl. No. 16/375,525, filed Apr. 4, 2019.
Mane S., "Effect of Porogens (Type and Amount) on Polymer Porosity: A Review," Canadian Chemical Transactions, vol. 2, Issue 2, 2016, pp. 210-225.
Hensleigh et al., "Additive manufacturing of complex micro-architected graphene aerogels," Materials Horizons, vol. 5, No. 6, Nov. 2018, pp. 1035-1041.
Mu et al., "Porous polymeric materials by 3D printing of photocurable resin," Materials Horizons, 2017, pp. 442-449.
Zheng et al., "Ultralight, Ultrastiff Mechanical Metamaterials," Science, vol. 344, Issue 6190, Jun. 20, 2014, pp. 1373-1377.
Ge et al., "Multimaterial 4D Printing with Tailorable Shape Memory Polymers," Scientific Reports, No. 6:31110, Aug. 8, 2016, pp. 1-11.
Lewis, J., "Direct Ink Writing of 3D Functional Materials," Advanced Functional Materials, vol. 16, 2006, pp. 2193-2204.
Rodriguez et al., "Shape-morphing composites with designed micro-architectures," Scientific Reports, No. 6:27933, Jun. 15, 2016, pp. 1-10.
Zhu et al., "Highly compressible 3D periodic graphene aerogel microlattices," Nature Communications, No. 6:6962, Apr. 22, 2015, pp. 1-8.
Biener et al., "Advanced carbon aerogels for energy applications," Energy & Enviornmental Science, vol. 4, Feb. 16, 2011, pp. 656-667.
Oakdale et al., "Post-print UV curing method for improving the mechanical properties of prototypes derived from two-photon lithography," Optics Express, vol. 24, No. 24, Nov. 28, 2016, pp. 27077-27086.
Duoss et al., "Three-Dimensional Printing of Elastomeric, Cellular Architectures with Negative Stiffness," Advanced Functional Materials, vol. 24, 2014, pp. 4905-4913.
Gladysz et al., "Chapter 4: Techniques for Introducing Intentional Voids into Materials," Voids in Materials, Elsevier B.V., 2015, pp. 49-71.
Zheng et al., "Multiscale metallic metamaterials," Nature Materials, vol. 15, Oct. 2016, pp. 1100-1106.
Chen et al., "Preparation of polymer-based porous scaffolds for tissue engineering," Characterisation and Design of Tissue Scaffolds, Elsevier B.V., 2016, pp. 105-125.
Rolland et al., "Solvent-Resistant Photocurable "Liquid Teflon" for Microfluidic Device Fabrication," Journal of the American Chemical Society, vol. 126, 2004, pp. 2322-2323.

(Continued)

*Primary Examiner* — K. Boyle
(74) *Attorney, Agent, or Firm* — Zilka-Kotab, P.C.

(57) ABSTRACT

According to one embodiment, a mixture includes a fluoropolymer monomer having at least one functional group amenable to polymerization, a pore-forming material, and a polymerization initiator. According to another embodiment, a product includes a porous three-dimensional structure comprising a crosslinked fluoropolymer, where at least 20% of a volume measured within an outer periphery of the porous three-dimensional structure corresponds to the pores.

20 Claims, 11 Drawing Sheets

(56) References Cited

OTHER PUBLICATIONS

Williams et al., "High-Resolution PFPE-based Molding Techniques for Nanofabrication of High-Pattern Density, Sub-20 nm Features: A Fundamental Materials Approach," American Chemical Society, Nano Letters, vol. 10, 2010, pp. 1421-1428.

Demarco et al., "A New Perfluoropolyether-Based Hydrophobic and Chemically Resistant Photoresist Structured by Two-Photon Polymerization," American Chemical Society, Langmuir, vol. 29, 2013, pp. 426-431.

Keller et al., "Study of Biofilm Growth on Slippery Liquid-Infused Porous Surfaces Made from Fluoropor," American Chemical Society, Applied Materials and Interfaces, vol. 11, Jan. 15, 2019, pp. 4480-4487.

Helmer et al., "Transparent, abrasion-insensitive superhydrophobic coatings for real-world applications," Scientific Reports, vol. 7, Nov. 8, 2017, pp. 15078:1-15078:6.

Ebnesajjad, S., "Manufacturing of Various Shapes of Expanded Polytetrafluoroethylene (ePTFE)," Expanded PTFE Applications Handbook, Elsevier Inc., 2017, pp. 129-161.

Ebnesajjad, S., "History of Expanded PTFE and W.L. Gore and Associates," Chapter 4, Introduction to Fluoropolymers Materials, Elsevier Inc., 2013, pp. 37-52.

Pang et al., U.S. Appl. No. 17/368,598, filed Jul. 6, 2021.

* cited by examiner

FIG. 5A
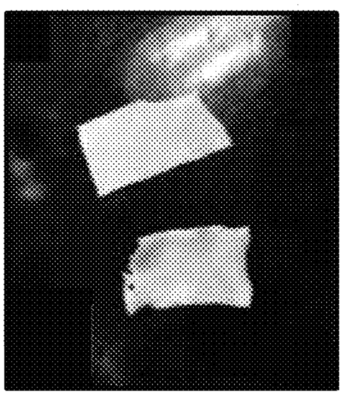
FIG. 5B
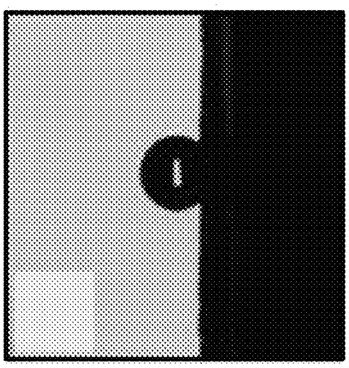
FIG. 5C
Thermal Cure
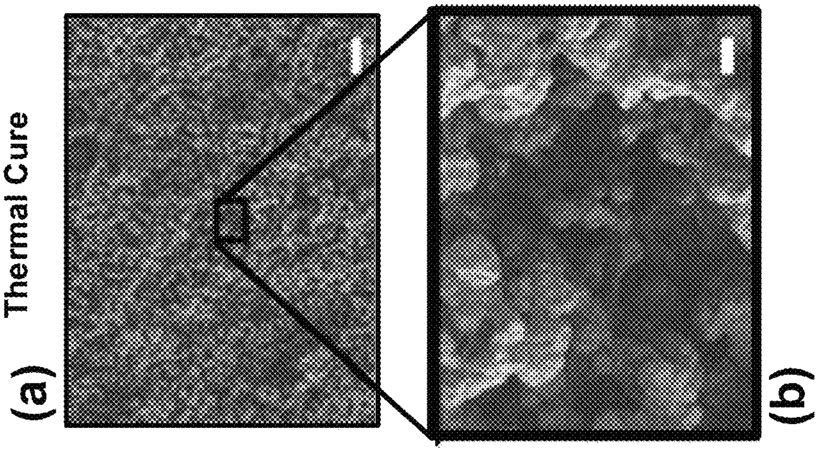
FIG. 5D
UV Cure
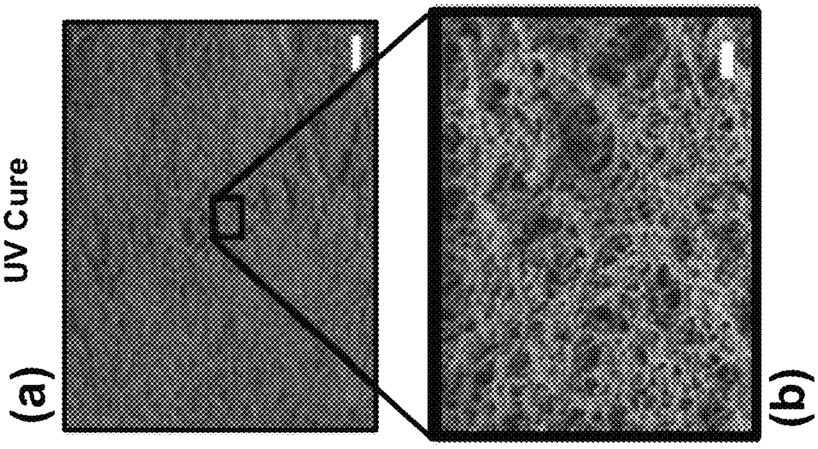
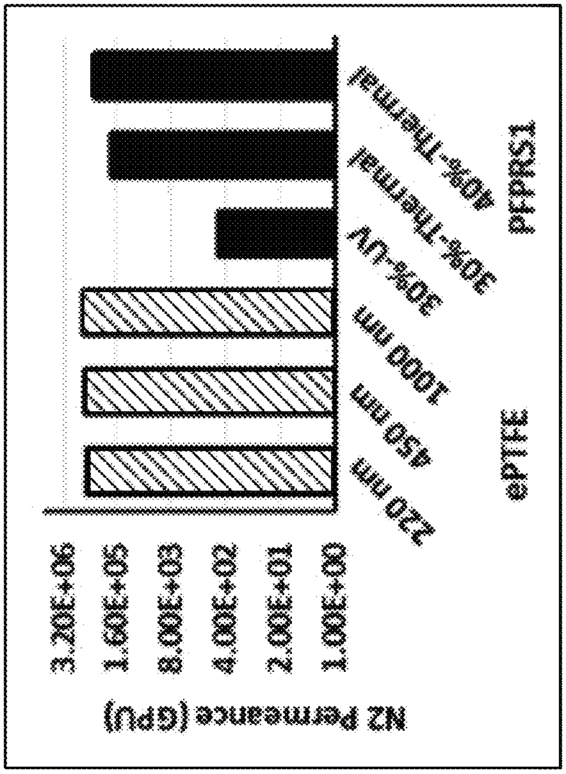
FIG. 5E FIG. 8A
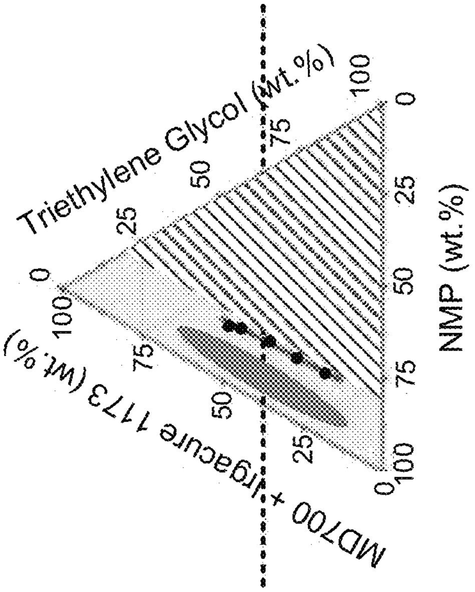
FIG. 8B
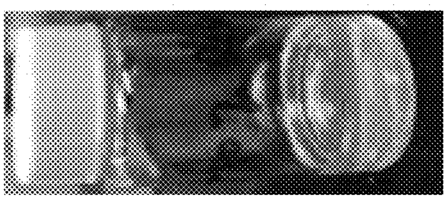
FIG. 8C
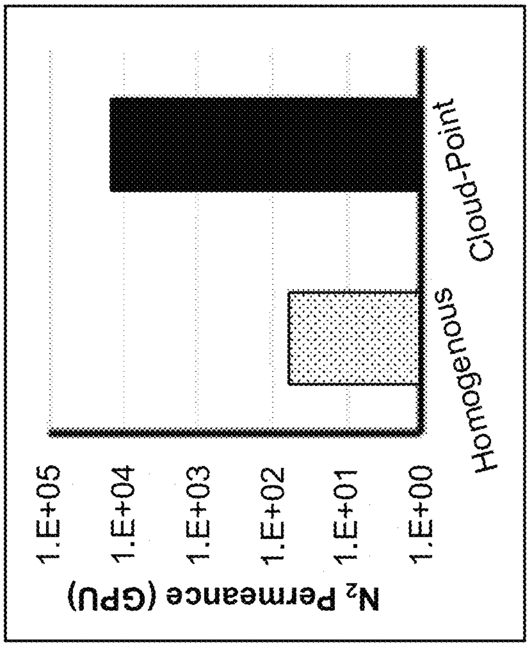
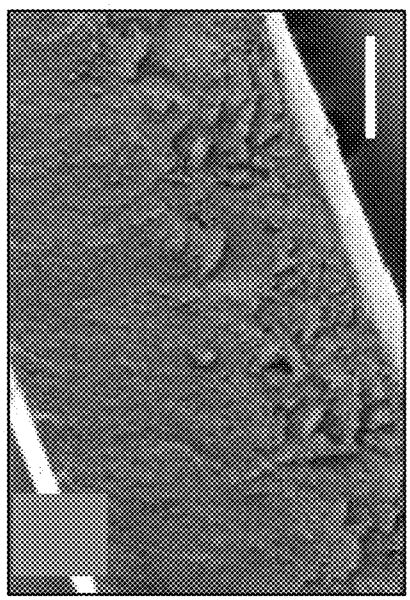
FIG. 8D
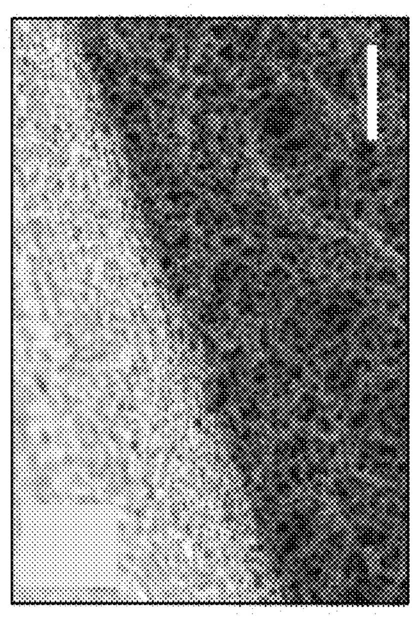
FIG. 8E

ACTINIC AND THERMAL CURE FLUOROPOLYMERS WITH CONTROLLED POROSITY

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to porous fluoropolymers, and more particularly, this invention relates to actinic and thermo-cure fluoropolymers having selectable porosity and method of making via a variety of manufacturing techniques.

BACKGROUND

Fluoropolymers are a commercially important class of materials most notable for their "non-stick" and friction reducing properties. A fluoropolymer is a fluorocarbon-based polymer having multiple carbon-fluorine bonds and shares similar properties as fluorocarbons as not being susceptible to van der Waals forces. These properties of being non-stick and friction reducing contribute to fluoropolymers being resistant to solvents, acids, and bases. Moreover, fluoropolymers display excellent resistance toward corrosive chemicals, have excellent mechanical properties, good high temperature performance, and outstanding dielectric strength.

There are generally two commercial porous fluoropolymers: expanded poly(tetrafluoroethylene) (ePTFE) and sintered poly(tetrafluoroethylene) (sPTFE). sPTFE tends to have a smaller microscale structure than ePTFE. Due to excellent dielectric properties, ePTFE is often used for electrical insulation. The desirable combination of water repellency coupled with gas transport makes ePTFE an outstanding fabric material for waterproofing. ePTFE allows water vapor to escape, while rejecting liquid water thereby enabling comfortable, wearable fabrics. This feature also makes ePTFE desirable as gas diffusion layers in many electrochemical energy storage and conversion devices such as fuel cells and batteries. Moreover, conventional ePTFE material, both the internal structure and the surface structure, is highly desirable for biomedical applications due in large part to superior bio-growth resistance, filtration properties, breathability, and overall inertness of fluoropolymers. Examples of biomedical applications include patches, lipoatrophy implants, sutures, lead assemblies, stents, and dental floss. In addition, ePTFE material is also utilized as a sealant or gasketing material.

However, conventional methods of forming fluoropolymers such as ePTFE and sPTFE are restricted to two dimensional material. Moreover, processing of conventional fluoropolymer material requires specialized equipment. Conventional fluoropolymer material is typically dissolved in solvent to melt at high temperatures to form a gel, and then the gelled material is stretched in planar directions, e.g., in the x-direction and then the y-direction, resulting in a two-dimensional (2D) sheet. Thus, shapes of conventional fluoropolymer material are limited to shapes formed with the 2D material, e.g., cylindrical, planar form factors, tubes, sheets, and other geometrically simple shapes.

Forming a three-dimensional (3D) object of fluoropolymer material is a challenge. In some conventional approaches, rolls of thin 2D fluoropolymer material may be used to wrap the surface of a 3D structure to impart the desired fluoropolymer functionality to a formed 3D structure. Thus, current methods of forming a three-dimensional fluoropolymer object are limited to a method of taping a 3D structure with the 2D fluoropolymer material.

Over the past decade, advances in additive manufacturing (AM) have enabled the fabrication of low-density, high-strength materials with engineered 3D architectures. AM technologies such as stereolithography, fused deposition modeling (FDM), selective laser sintering (SLS), and direct ink writing (DIW) have demonstrated the ability to pattern to varying degrees, a wide variety of materials, including metals, ceramics, plastics, rubbers, etc. Different AM techniques are distinguished from one another based on material processability, resolution capability and throughput. In other words, not all materials are directly amenable to AM, and moreover, factors such as cure-rate, rheological properties, stability, compatibility, etc. need to be considered and adjusted accordingly.

It would be desirable to develop a process of forming a 3D fluoropolymer structure using AM technology. However, AM techniques tend to produce parts with limited resolution; nanofeatures are difficult to print using some resins. Rather, nanofeatures may need to be integrated in the resin using alternative methods so that a nanostructure develops after the printing process by principles of self-assembly and self-organization.

SUMMARY

In one embodiment, a mixture includes a fluoropolymer monomer having at least one functional group amenable to polymerization, a pore-forming material, and a polymerization initiator.

In another embodiment, a product includes a porous three-dimensional structure comprising a crosslinked fluoropolymer, where at least 20% of a volume measured within an outer periphery of the porous three-dimensional structure corresponds to the pores.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 5A is an image of a freestanding porous fluoropolymer film, according to one embodiment.

FIG. 5B is an image of a water droplet in contact with a fluoropolymer film, according to one embodiment.

FIG. 5C are scanning electron microscope images of a thermally-cured 40 wt. % porous fluoropolymer resin, according to one embodiment. Part (a) is an image at low magnification, part (b) is a magnified view of a portion of the field in part (a).

FIG. 5D are scanning electron microscope images of an ultraviolet-flood-cured 40 wt. % porous fluoropolymer resin, according to one embodiment. Part (a) is an image at low magnification, part (b) is a magnified view of a portion of the field in part (a).

FIG. 5E is a graph of $N_2$ permeance data for a series of commercial ePTFE materials and a series of porous fluoropolymer resin materials, according to one embodiment.

FIG. 8A is a ternary phase diagram used to predict complex solution behavior for forming a cloud-point porous fluoropolymer resin mixture, according to one embodiment.

FIG. 8B is an image a cloud-point solution prior to curing, according to one embodiment.

FIG. 8C is graph of N2 permeance values for a 40 wt. % porous fluoropolymer resin samples with cloud-point solution, according to one embodiment.

FIG. 8D is an image of a scanning electron micrograph depicting a cross-section of a cloud-point UV-cured porous fluoropolymer resin at a low magnification, according to one embodiment.

FIG. 8E is an image of a scanning electron micrograph depicting a cross-section of a cloud-point UV-cured porous fluoropolymer resin at a high magnification, according to one embodiment.

DETAILED DESCRIPTION

Figure 1A:
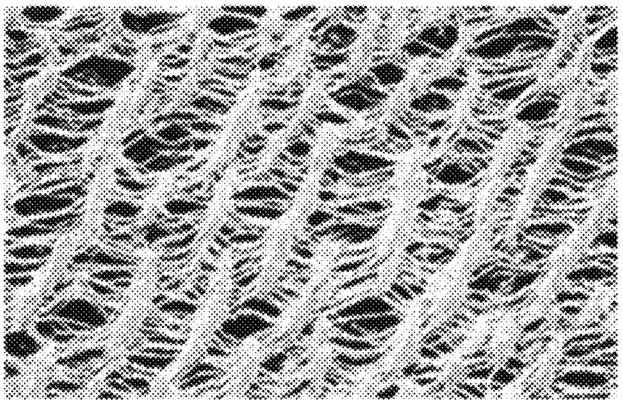
FIG. 1A is a reference scanning electron microscope image of ePTFE.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that, ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt. % is defined as the percentage of weight of a particular component relative to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at. %) is defined as a percentage of one type of atom relative to the total number of atoms of a compound.

A nanoscale is defined as between 1 nanometer and about 500 nanometers.

For the purposes of this description, the levels of porosity are defined as the following: macro-porosity is defined as pores having an average diameter of greater than 50 nanometers (nm). Meso-porosity is defined as having an average diameter of less than 50 nm and greater than about 2 nm. Micro-porosity is defined as having an average diameter less than about 2 nm and greater than 0 nm. These ranges are approximate and may overlap slightly.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

It should be noted that any of the presently described materials and techniques for use and/or manufacture thereof may be utilized in any combination or permutation. While certain techniques have been set forth under headings and with reference to particular applications, one having ordinary skill in the art reading the present disclosure would appreciate that each technique, and even the sub-techniques thereof, could be utilized broadly in any suitable application. Accordingly, the foregoing descriptions are not to be considered limiting on the manner of manufacturing or using the multifunctional reactive inks described herein.

The following description discloses several preferred embodiments of porous fluoropolymer material and/or related systems and methods making thereof.

In one general embodiment, a mixture includes a fluoropolymer monomer having at least one functional group amenable to polymerization, a pore-forming material, and a polymerization initiator.

In another general embodiment, a product includes a porous three-dimensional structure comprising a crosslinked fluoropolymer, where at least 20% of a volume measured within an outer periphery of the porous three-dimensional structure corresponds to the pores.

A list of acronyms used in the description is provided below.

2D Two-dimensional
3D Three-dimensional
AM Additive Manufacturing
at. % atomic weight percent
$cm^2$ centimeter squared
CNC Computer numerical control
cP centipoise
DIW Direct ink writing
DLW-TPP Direct laser writing-two photon polymerization
DMF dimethylformamide
ePTFE expanded poly(tetrafluoroethylene)
FG Functional group
mm millimeter
μm micron
mW milliwatts
$N_2$ Nitrogen gas
nm nanometer
NMP N-methyl-2-pyrrolidone
PFPRS1 porous fluoropolymer resin system 1
PFPRS2 porous fluoropolymer resin system 2
PGMEA propylene glycol monomethyl ether acetate
PFPE perfluoropolyether
PTFE poly(tetrafluoroethylene)
PμSL Projection microstereolithography
SEM Scanning Electron Micrograph
sPTFE sintered poly(tetrafluoroethylene)
UV Ultraviolet As described herein, fluoropolymers that contain a significant amount of air or void space is a material with a microporous structure. The micro porosity of the material enables gas transport and further increases the dielectric strength of porous fluoropolymers, such as expanded poly (tetrafluoroethylene) (ePTFE) relative to their bulk and nonporous counterparts, such as PTFE. Moreover, the underlying fluoropolymer matrix retains the ability to repel liquids, water, etc. In one example, for example, ePTFE is capable of transporting gases (including such as water vapor) while repelling liquids (notably liquid water repellency).

Conventional production of ePTFE and sPTFE typically begins with micro-spheres of PTFE. For ePTFE, microspheres are heated just to the point of melting before being stretched to impart porosity. For example, PTFE may be uniaxially stretched first in one direction and then stretched in a second direction within the same plane resulting in a microstructure consisting of nodules and fibers. FIG. 1A is reference image of a scanning electron micrograph (SEM) of ePTFE showing the nodules and fibers of the stretched material.

Figure 1B:
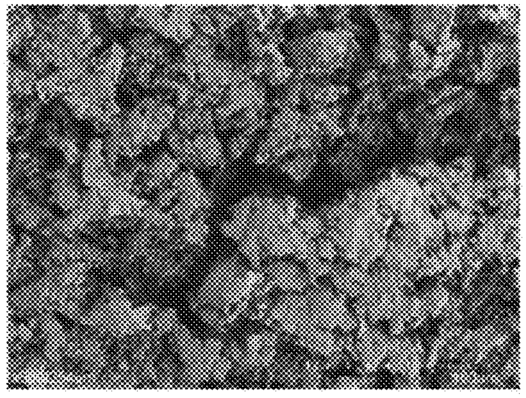
FIG. 1B is a reference scanning electron microscope image of sPTFE.

For sPTFE, an extractable filler is added to create a blend of filler with PTFE microspheres. The mixture is then heated, compressed, cooled and the filler is removed leaving behind voids. FIG. 1B reference image of an SEM of sPTFE showing the microstructure including voids of the material. However, each of these methods of forming ePTFE and sPTFE result in planar 2D material so applications of using fluoropolymers are limited to coatings, layers, membranes, etc. It is desirable to develop a method of forming a 3D structure comprised of porous fluoropolymer material. Moreover, these methods are limited to the porosity and surface structure generated by the conventional methods of forming the 2D material. It would be desirable to tune the porosity and surface structure of the fluoropolymer material for a given application.

According to one embodiment described herein, a fluoropolymer material has similar properties of gas transport with the ability to repel water and other liquids similar to conventional ePTFE products, and additionally has the ability to form a complex 3D structure by casting, 3D printing, etc. In one embodiment, a method of forming porous fluoropolymer material begins with a mixture fluoropolymer monomers that may be induced to transform from a liquid to a solid upon application of light or heat, depending on how the mixture formulation is tuned. In one approach, during 3D printing of the mixture, the mixture includes a pore-forming material that maintains the porosity of the material during printing and subsequent processing. For example, similar to methods of making a coarse material, a pore-forming material such as a solvent, a bystander, a porogen, etc. may be included in the mixture and this material does not cure, and then once the desired structure is formed, the pore-forming material is washed out of the structure resulting in a 3D structure with void space.

According to one embodiment, a method is described that creates and tunes the porosity of a porous 3D fluoropolymers at multiple length scales via formulation of thermal and/or actinic curable resins. The porous fluoropolymers described herein impart tunability over shape, pore-structure, final material properties, etc. The combination of structure and material control imparts unique functionality. Additionally, the approach described herein simplifies the manufacturing process while also increasing design space by enabling techniques such as casting, coating, molding, 3D printing, etc. for shaping and forming porous fluoropolymers.

According to various embodiments, 3D-structured porous fluoropolymer formulations are highly tunable and may be optimized for a given application. For instance, the 3D-printable nature of the fluoropolymer mixture allows the material to be structured into any arbitrary shape. 3D printing techniques enable complexity, design freedom, and customization by circumventing restrictions imposed by traditional manufacturing, such as CNC (computer numerical control) milling limitations. 3D printing techniques may impart macro-, meso- and microscale porosity. Moreover, 3D printing techniques allow fine-tuning of the structure (e.g., geometric pattern, log-pile, etc.). 3D printing techniques additionally simplify the manufacturing process by increasing fabrication speed for limited, one-of-the-kind production runs while also reducing waste (e.g., compared to waste formed during traditional subtractive manufacturing).

In conventional methods, porous polymers may be prepared using bulk chemical processes that introduce porosity by physical and/or chemical blowing agents, by leaching of porogens, etc. Porogens may be defined as any mass of material that can be used to create a porous structure upon removal after solidification via chemical crosslinking/reaction of the surrounding material. Removal of the porogen by leaching leaves negative replica pores in the structure, these pores may range in size from several nanometers (nm) to 100 s of microns depending on the composition and concentration of the porogen.

As described herein, according to one embodiment, fluoropolymer formulations used in any fabrication technique disclosed herein may include a sacrificial material, e.g., a porogen, that generates nano- to micro-scale porosity within the resulting cured material. In one approach, porogens may be added to the fluoropolymer mixture prior to curing. In other approaches, porogens may be generated in the fluoropolymer mixture during the curing process via intrinsic chemical reactions.

In one approach, porogens may be removed from the material during curing. In preferred approaches, porogens may be removed from the material post curing to generate a nano/micro porous structure within the fluoropolymer material. Methods for removing the porogen include, but are not limited to, evaporation, freeze drying, super critical drying, dissolution, degradation, and/or sublimation.

In one embodiment, the pore structure of the fluoropolymer material may be tunable. In addition, for a given porogen, the pore morphology and shape may be tuned by the techniques of the curing process and/or the ratio of the porogen to the fluoropolymer. Pore size and morphology may be controlled, determined, tuned, etc. by the type, shape, and removal process of the porogen.

According to one embodiment, a mixture of a fluoropolymer-based resin including a pore-forming material (e.g., porogen) may be used as a feedstock for additive manufacturing (AM) processes. Following printing of a three-dimensional structure with the mixture comprising the fluoropolymer-based resin including a porogen, the porogen within the printed part may be leached away thereby resulting in the formation of hierarchical porous structure with sub-micron pores.

The present disclosure includes several descriptions of exemplary “resin” or “ink” used in an additive manufacturing process to form the inventive structures described herein. It should be understood that, depending on the additive manufacturing process, each term “resins” or “inks” (and singular forms thereof) may be used interchangeably and refer to a composition of matter comprising monomers dispersed throughout a liquid phase. For example, inks refer to the composition of matter that may be “written,” extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence. Moreover, the following description discloses several preferred embodiments of an UV-curable polymer resins for polymer foams formed by additive manufacturing and/or related systems, methods, and formulations.

The following description discloses several preferred structures formed via additive manufacturing techniques, e.g., direct ink writing (DIW), extrusion freeform fabrication, projection microstereolithography (PμSL), or other equivalent techniques and therefore exhibit unique structural and compositional characteristics conveyed via the precise control allowed by such techniques. In the case of DIW, the physical characteristics a structure formed by extrusion of an ink may include having lower layers of the structure are slightly flattened, slightly disfigured from original extrusion, etc. by weight of upper layers of structure, due to gravity, etc. The three-dimensional structure formed by DIW may have a single continuous filament that makes up at least two layers of the 3D structure.

In the case of UV-curable polymer resins, the physical characteristics of a structure formed by direct laser writing-two photon polymerization (DLW-TPP) allow formation of a structure and features via polymerization with portions of the resin unpolymerized.

For the purposes of this disclosure, a ligament, feature, filament, etc. printed by AM processes are portions of a predefined structure that define a complex shape. For example, a structure may be defined by continuous ligaments extending from one end of the structure to the opposite end. In addition, the printed ligaments may be arranged in a vertical direction thereby resulting in a thickness of the structure. The thickness of the 3D structure is greater than the diameter than at least one of the ligaments. Moreover, the ligaments may be arranged in a complex geometric shape. The arrangement of the ligaments may form uniform and/or continuous pores, where an average diameter of the pores is measured between adjacent ligaments.

According to various embodiments, methods are described for forming a feedstock as a precursor for 3D printable structures. The arrangement of the printed ligaments in the 3D structure may provide a higher-order porosity (10s to 100s microns). In one approach, nanoporous structures formed by methods described herein may be useful for applications that include mass transport.

The printed hierarchical porous polymer structure may find use for such applications as membranes, light weight yet stiff structural materials, etc. The resulting well-defined nanoporous polymer framework may include additional materials that impart electrical conductivity, for example carbon nanotubes may be included in the ink before formation of a structure. Various embodiments described herein enable fabrication of 3D fluoropolymer structures with engineered hierarchical structures including digitally controlled macroporous systems for fast mass transport and nanopores for high surface area. For example, in one approach, a fluoropolymer structure may be formed with a higher level porosity having pores in a range of greater than 1 millimeter (mm) (e.g., macroporous), and having ligaments with average length scales greater than 1 micron (μm), where the ligaments are characterized by nanoporous material.

According to one embodiment, a mixture includes a fluoropolymer-monomer having at least one functional group amenable to polymerization, a pore-forming material, and a polymerization initiator. For example, the fluoropolymer may have at least one functional group amenable to crosslinking.

In one approach, the mixture may include a fluoropolymer monomer having at least two functional groups amenable to polymerization and a porogen. In one approach, the mixture may be a resin. In one approach, the mixture may be an ink.

Fluoropolymer resins include carbon (C) bonded to fluorine (F) designated as a CF group, e.g., CF2, CF3 groups, so as to impart characteristic fluoropolymer properties, such as high liquid contact angles, water repellency and/or good dielectric properties.

Figure 2:
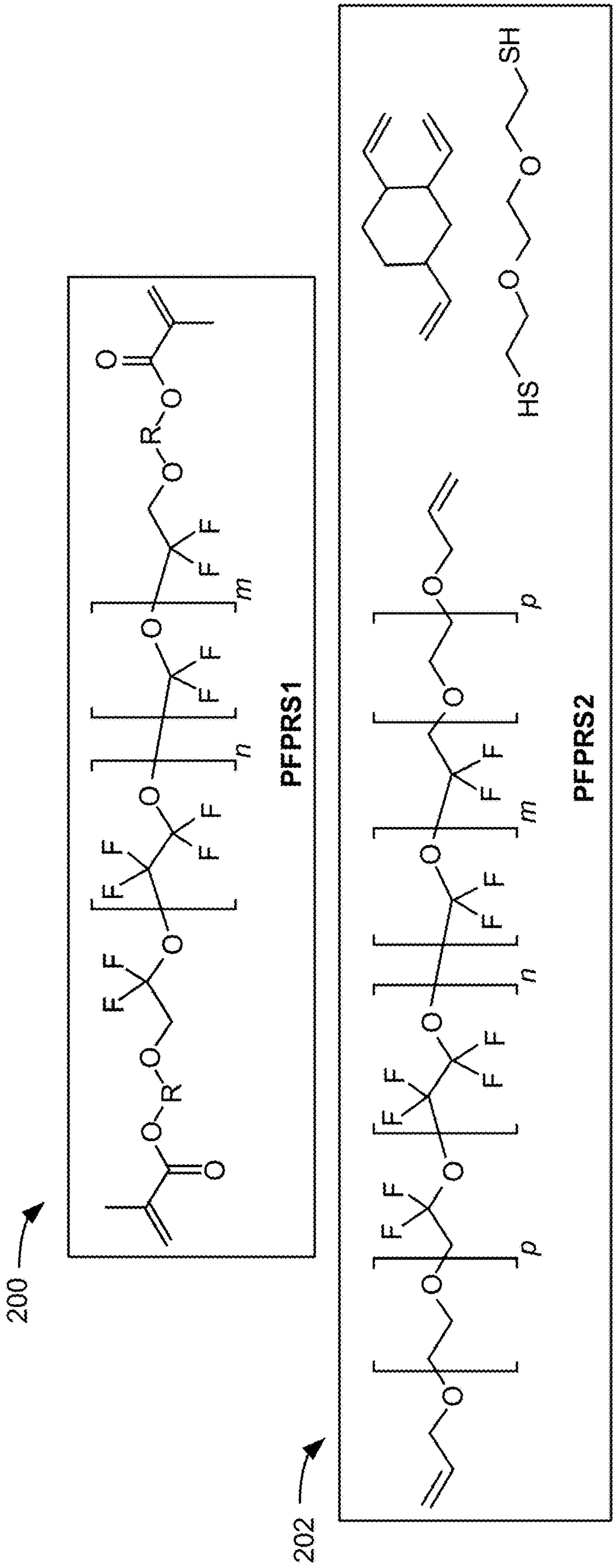
FIG. 2 depicts formulas of reactive fluoropolymer monomers present in porous fluoropolymer resins, according to one embodiment.

In some approaches, exemplary examples of fluoropolymer monomers may include functionalized fluoropolymer monomers such as those depicted in FIG. 2. In one approach, a porous fluoropolymer resin system 1 (PFPRS1) includes a fluoropolymer monomer 200 that may be obtained commercially (e.g., from Solvay, Inc, WV, USA). In other approaches the fluoropolymer monomer may be synthesized. For example, synthesis reactions include well-understood chemical reactions (e.g., nucleophilic substitution, etc.) using perfluoropolyether (PFPE) constituents. For example, a porous fluoropolymer resin system 2 (PFPRS2) includes a fluoropolymer monomer 202 that may be synthesized by a nucleophilic substitution starting from an allyl bromide and a dialcohol terminated, ethoxylated PFPE (Fluorolink E10H, obtained commercially from Solvay, Inc).

In one approach, the mixture (e.g., fluoropolymer resins) may include the fluoropolymer monomer having an atomic weight percentage (at. %) of fluorine in a range of between about 10 at. % to about 90 at. %. In preferred approaches, the fluorine may be present in a range of between about 25 at. % to about 75 at. %. In an exemplary approach, fluorine may be present in a range of about 40 at. % to about 90 at. %.

In one approach, a concentration of the fluoropolymer monomer in the mixture (e.g., fluoropolymer resin) may be in a range of about 10 wt. % to about 95 wt. % relative to the total weight of the mixture. Preferably, a concentration of the fluoropolymer monomer in the mixture may be in a range of about 15 wt. % to about 70 wt. % relative to the total weight of the mixture. In an exemplary approach, a concentration of the fluoropolymer monomer in the mixture may be in a range of about 20 wt. % to about 60 wt. % relative to the total weight of the mixture. In preferred approaches, the mixture is in a liquid form, e.g. a homogeneous mixture, heterogeneous-slurry type mixture, etc. The length and/or concentration of fluoropolymer monomer may be limited by the ability of the fluoropolymer monomer to be dissolved in the solvent and/or porogen.

In some approaches, the mixture (e.g., fluoropolymer resin) is a liquid. In some approaches, no solid particles are present in the liquid at room temperature (e.g., 22 to 25° C.). Accordingly, the average chain length of the monomer is preferably in a range that allows the mixture to remain a liquid at ambient conditions until curing. The fluoropolymer resin may include fluoropolymers that are linear or branched. For curing processes such as thermosetting, a crosslinked network may be generated with an infinitely high molecular weight. The degree of crosslinking may contribute to the final mechanical properties of the cured fluoropolymer resin.

According to one embodiment, a resin to form a fluoropolymer includes fluoropolymer monomers having reactive functional groups to enable curing. In one approach, fluoropolymer resins may cure, i.e., transition from a liquid state to a solid state, upon addition of a catalytic species combined with an external stimulus. For example, but not meant to be limiting, external stimuli may include thermal energy, actinic radiation (e.g., commonly but not limited to ultraviolet light), etc.

In some approaches, a fluoropolymer resin includes a fluoropolymer monomer having at least one functional group amenable, susceptible, reactive, etc. to polymerization. For instance, the functional group may be capable of being acted upon in a particular way to result in polymerization of the monomers. In some approaches, polymerization may lead to crosslinking between neighboring polymer chains. In some approaches, reactions among functional groups may create a crosslinking structure.

In preferred approaches, fluoropolymer resins may include one or more functional groups that are reactive chemical groups appended to the ends (i.e., telechelic) or along the backbone of the fluoropolymer monomer. Exemplary examples of reactive chemical groups include, but are not limited to acrylates, methacrylates, cyanoacrylates, epoxides, allyl ether, vinyl ether, norbornene or other alkene containing molecules, propargyl ethers, azides, isocyanates, thiols, alcohols, silanes, silanols, acids, acid chlorides, amines, etc.

In some instances, fluoropolymer resin formulations may include two or more reactive chemical groups to enable thermosetting and/or curing via crosslink formation. Examples of reactive chemical groups include; thiols (e.g., mercapto groups) combined with allyl ethers, vinyl ethers or norbornene groups, isocyanates combined with alcohols (to produce polyurethanes) or amines (to produce polyureas), azides combined with propargyl ethers, acid chlorides combined with amines or alcohols, epoxides combined with alcohols, thiols or amines. In other instances, fluoropolymer resins will utilize multiple, orthogonal cure chemistries for improved material properties. This form of curing strategy may be referred to as dual cure. Examples of dual cure include, acrylates and/or methacrylate containing monomers combined with epoxide containing monomers, acrylates and/or methacrylate containing monomers combined with isocyanate containing monomers.

In one approach, acrylate functional groups may undergo homo-polymerization. In another approach, thiol functional groups on the fluoropolymer monomer may be included in a two-part curing mixture, e.g., Part A having a thiol functional group and Part B having an allyl ether. In one approach, a structure may be formed using multiple cure steps such that a second cure chemistry does not interfere with the first cure chemistry. For example, an initial step includes a UV-curable functional group of the material being activated by UV, and then a second step of forming the desired structure includes curing the thermally-curable functional groups of the material by placing the material in an oven to initiate the second type of cure chemistry.

In one approach, the mixture includes a fluoropolymer monomer having at least one functional group amenable to radical polymerization combined with a polymerization initiator that is a photoinitiator, then the functional group of the fluoropolymer monomer may be amenable to radiation-initiated polymerization. In general, a radiation curable functional group may be any suitable group or molecule that provides the desired effect upon curing, e.g., crosslinking, polymerization, etc. In one approach, a fluoropolymer monomer has at least one functional group that when combined with an appropriate photoinitiator will cure under ultraviolet irradiation. The photoinitiator determines the response to light, thus, for example, a photoinitiator makes the resin sensitive towards UV. Thus, a fluoropolymer monomer preferably has functional groups amenable to radical polymerization, but these functional groups preferably are not sensitive to UV in the absence of a photoinitiator.

In some approaches, the fluoropolymer monomer may have a functional group that is amenable to undergoing curing chemistry. For example, the mixture comprising the functionalized fluoropolymer monomer may create a radical, create an acid molecule, etc. with or without a catalytic species that subsequently allows the mixture to undergo a curing chemistry reaction. The methodology of catalysis-mediated curing chemistry is generally understood by one skilled in the art and could be applied with standard materials available commercially.

According to one embodiment, a solid state of the fluoropolymer material may have a fine pore structure with pores having an average diameter in a range from 1 nanometer (nm) to about 1,000,000 nm (e.g., 1000 microns (μm) or 1 mm). In preferred approaches, a fluoropolymer material may have a pore structure with pores having an average diameter in a range of about 10 nm to about 100,000 nm (10 μm). In exemplary approaches, a fluoropolymer material may be a pores structure with pores having an average diameter in a range of 100 nm to about 10,000 nm.

As noted above, the mixture includes a pore-forming material. The concentration of the pore-forming material in the mixture may be any concentration selected to provide the desired average porosity. In general, a concentration of the pore-forming material in the mixture is in a range of greater than 0 wt % to about 98 wt % of total mixture.

In one approach, the pore-forming material of the mixture (e.g., fluoropolymer resin) is a porogen. In one approach, the porogen is a non-reactive component of the mixture. A porogen or a pore-forming substance may be any substance added to the formulation that does not directly participate in the curing of the fluoropolymer component.

In one approach, a concentration of the porogen in the mixture may be in a range of greater than 0 wt. % to about 98 wt. % of the total mixture. In one approach, low concentration of porogen in the mixture may result in loss the porous interconnectivity. For example, in one approach, a concentration of less than 20 wt. % porogen with greater than 80 wt. % fluoropolymer monomer may result in a structure in which the porogen is difficult to remove thereby becoming sealed, trapped, etc. in the material of the structure. In another approach, higher concentrations of porogen with less fluoropolymer monomer, may threaten the structural integrity of the formed structure, e.g., too much porous interconnectivity, increased void space, etc. Thus, preferably, the concentration of porogen in the mixture depends on the application and use of the desired porous 3D structure.

In one approach, the porogen may be a gaseous component of the mixture. For example, gases such as a dissolved carbon dioxide, fluorocarbons, or water vapor, may be included as a porogen.

In one approach, the porogen may be a liquid solvent. For example, solvents such as any nonreactive organic solvent may be included as a porogen. In one approach, the fluoropolymer monomer may be dissolved in a non-reactive organic solvents that later serve as porogen after curing of the material. Selected porogen organic solvents include dimethylformamide (DMF), N-methyl-2-pyrrolidone (NMP), acetone and propylene glycol monomethyl ether acetate (PGMEA). In principle, most organic solvents may serve as a porogen, provided the organic solvent does not participate in the curing/thermosetting reaction(s) and can thoroughly be removed after curing.

In one approach, the porogen may be a solid component of the mixture. For example, salts such a sodium chloride may be included as a porogen. In other approaches, small molecules such as urea, sublimable molecules such as naphthalene, etc. may be included as a porogen. In some approaches, the fluoropolymer monomers having functional groups amenable to polymerization are soluble in a porogen.

In some approaches, the porogen may include any non-reactive diluent that is miscible with the fluoropolymer monomer, such that porogen may be subsequently removed upon crosslinking (e.g., polymerization) of the fluoropolymer monomer.

Porogens may be removed from the fluoropolymer-based resin during curing or during postprocessing steps following curing. Removal of the porogen creates void space that forms the nano-to-micro-scale porosity within the fluoropolymer material. Processes to remove the porogen may include evaporation, sublimation, dissolution, degradation, solvent-to-gas exchange, etc. In approaches to preserve pore morphology formed by the porogen, careful liquid drying procedures, such as freeze-drying or super-critical drying may be applied to the fluoropolymer material.

In one approach, the pore-forming material may be a pore-forming substance that assists in generating gaseous species during curing. For example, porogen-mediated porosity may be generated during the curing process. In one approach, specific gas forming reactions may be employed to generated gaseous species during the curing process. For example, the fluoropolymer resin may include silane and silanol functional groups that react with one another to generate hydrogen gas. The hydrogen gas bubbles become the porogen in the fluoropolymer material. The concentration of the pore-forming substance in the mixture may be any concentration selected to provide the desired average porosity. In general, a concentration of the pore-forming substance in the mixture is in a range of greater than 0 wt % to about 98 wt % of total mixture.

In one example, some types of polyurethanes cause internal gas forming reactions. In a two part mixture, e.g., part A and part B, components of part A chemically react with components in part B and form a gas molecule, the gas molecules form a void, thereby forming pores in the material. In one approach, the pores may be formed during the curing step of the material, such that the curing creates a gas internally, and the escaped gas would result in a porous material. This approach may eliminate a need for a complex drying processes of the porous 3D structure.

In one approach, a fluoropolymer material having sufficiently high and percolating porosity imparts gas permeability. In another approach, a fluoropolymer material having continuous and open-cell porosity imparts gas permeability.

The porosity of the formed 3D structure may be tuned by the formulation of the mixture of the functionalized fluoropolymer monomer and pore-forming material. Preferably, the solubility of the porogen and the monomer may be tuned to a solubility parameter such that the pore-forming material (e.g., porogen) forms pores having an average diameter from predefined parameters, e.g., hydrodynamic radius, crystal size, phase separation domain size, etc.

In some approaches, a concentration of the polymerization initiator in the mixture may be in a range of about 0.05 wt. % to about 5.0 wt. % relative to the total weight of the mixture. In one approach, the polymerization initiator is a photoinitiator. In another approach, the polymerization initiator is a thermal initiator.

In one approach, the mixture may be optically transparent. The mixture may have the physical property of allowing light to pass through without being largely scattered or adsorbed, (i.e., the majority of the light passes through). For instance, light may enter and travel through the mixture in a relatively undisturbed fashion. In some approaches, the mixture may be transparent to the visible spectrum in a range from about 400 nanometers (nm) to the near-infrared, about 750 nm. In some approaches, the mixture may have a transparency of greater than 75% transmittance of light.

In various approaches, the mixture includes a polymerization initiator (e.g., crosslinking agent, photoinitiator, etc.). In one approach, the polymerization initiator may be a thermal-active radical producing initiator. In another approach, the polymerization initiator may be a UV-active radical producing initiator. In various approaches, the concentration of the polymerization initiator in the mixture may be in a range of about 0.05 wt % to less than 2.0 wt % relative to the total weight of the mixture. In preferred approaches, the concentration of photoinitiator in the mixture is in a range of about 0.05% to about 1.0 wt % of total mixture.

One or more additives may be added to the mixture for optimal printing of a 3D structure, depending on the AM technique to be used. In various approaches, an additive to the mixture may include a photoabsorber, a polymerization inhibitor, etc. In one approach, the mixture includes a photoabsorber of any known type. Illustrative examples of photoabsorbers include benzopheone, benzotriazole, salicylate, etc.

The concentration of photoabsorber in the mixture may be similar to the concentration of photoinitiator in the mixture or may be different.

In some approaches, the mixture includes a polymerization inhibitor of any known type. Illustrative examples of a polymerization inhibitor include tert-butylhydroquinone, hydroquinone, 4-methoxyphenol, phenothiazine, etc. In some approaches, the mixture may include a polymerization inhibitor in an effective amount for inhibiting continuous polymerization of the fluoropolymer monomer after laser irradiation but not at an effective amount to prevent formation of a three-dimensional structure by light-mediated additive manufacturing techniques.

In some approaches, a polymerization inhibitor may be critical for determining the final porosity of printed parts formed by additive manufacturing techniques. In one approach, a concentration of polymerization inhibitor may be greater than 50,000 ppm. Without wishing to be bound by any theory, it is believed that during light-mediated additive manufacturing techniques, only a very small portion of porogen diluted monomer may be cured (e.g., voxel) within a larger surrounding matrix of uncured resin mixture. The monomer species within the volume of voxel react via a radical-induced polymerization upon photo-initiation to give a porous, aerogel-like network. Modeling efforts and observations have shown that active radical species may not simply die out upon complete consumption of monomer. Instead the radicals remain and may continue to slowly react with monomers diffusing in over time from the bulk photoresist into the cured structure (e.g., voxel). Thus, titrating polymerization inhibitor to the concentration of un-cured resin may be critical to retaining porosity of the formed 3D structure.

In one approach, the fluoropolymer-based resins are designed to flow as a liquid prior to curing. Preferably, the mixture (e.g., fluoropolymer resin) has a viscosity in a range of greater than 0 to about 100,000 centipoise (cP). In exemplary approaches, a fluoropolymer-based resin has a viscosity in a range of greater than 0 to 10,000 cP. The preferred range of viscosity of the mixture may depend on the manufacturing technique. For example, 3D printing via stereolithography may preferably use a mixture having viscosity in a range of above 0 to 10,000 cP. Other techniques such as casting, molding, etc. may use different viscosity ranges.

In various approaches, viscosity of the mixture may be tuned by varying the length of the fluoropolymer monomer, selecting a porogen, etc.

The thermosetting behavior of the fluoropolymer resin materials described herein may enable significant design space for developing customizable or highly optimized materials via an integrated approach. In one approach, the mixture (e.g., fluoropolymer resin) may include less than 5 wt. % (relative to total weight of the mixture) of an additive selected from the following: nanoparticles, a catalyst, an electron conductor, and mixtures thereof. Fluoropolymer formulations may include other reactive or property modifying species, such as nanoparticles, catalysts, electron conductors, etc. that remain in the final porous 3D structure. For instance, carbon black or carbon nanotubes can be dispersed within the fluoropolymer matrix to impart electrical conductivity.

In some approaches, a network backbone modification of the fluoropolymer monomer may improve functionality. In one approach, the mixture may include a fluoropolymer monomer that has at least one functional group thereon. The backbone of the fluoropolymer within the cured porous fluoropolymer network may be decorated by task specific functional groups, such as a charge cationic species (ammonium, phosphonium, sulphonium groups, etc.) for conducting negatively charged ions, including hydroxides halogens or other ionic liquids. These task specific functional groups may also be acidic (e.g., sulfonic acids) for conduction protons. In another example, oxime functional groups may be added to absorb and disarm organophosphorus nerve agents. In all cases, access to these functional groups may be provided by porosity imparted by the porogen. And in another example, carbon dioxide capturing groups, such as amines, amidines, guanidines, etc. may be appended to the fluoropolymer backbone to enhance carbon capture.

Figure 3A:
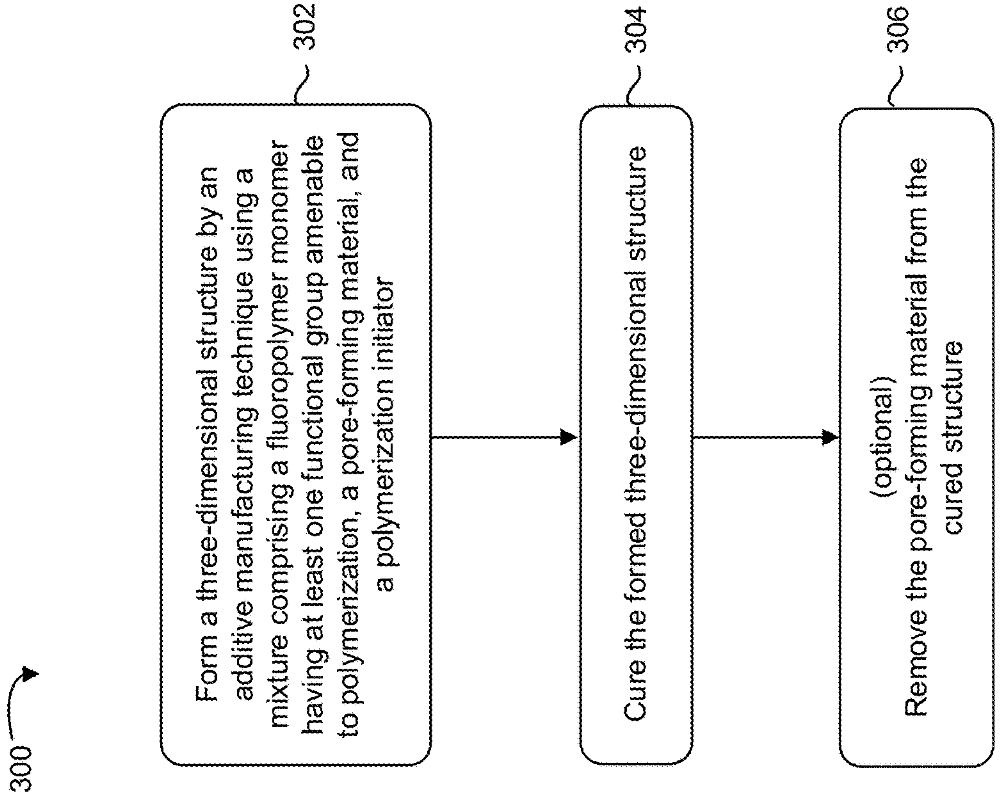
FIG. 3A is a flow chart of a method of forming a three-dimensional structure by an additive manufacturing technique, according to one embodiment.
Figure 3B:
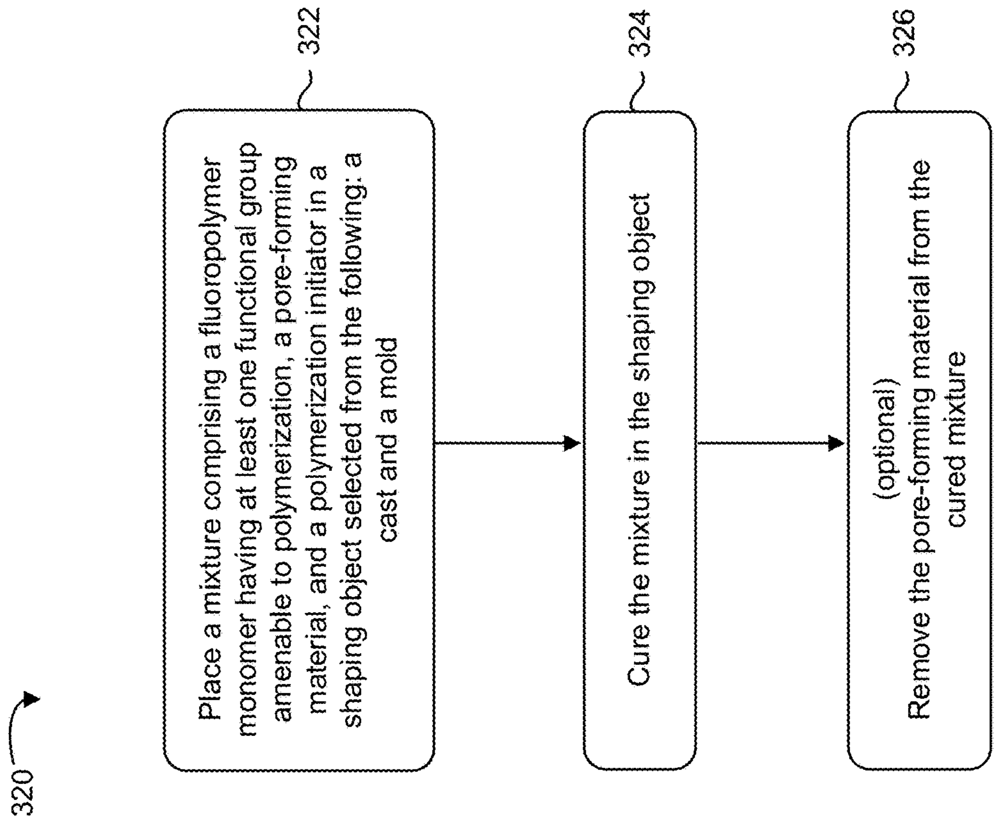
FIG. 3B is a flow chart of a method of forming a three-dimensional structure, according to one embodiment.
Figure 3C:
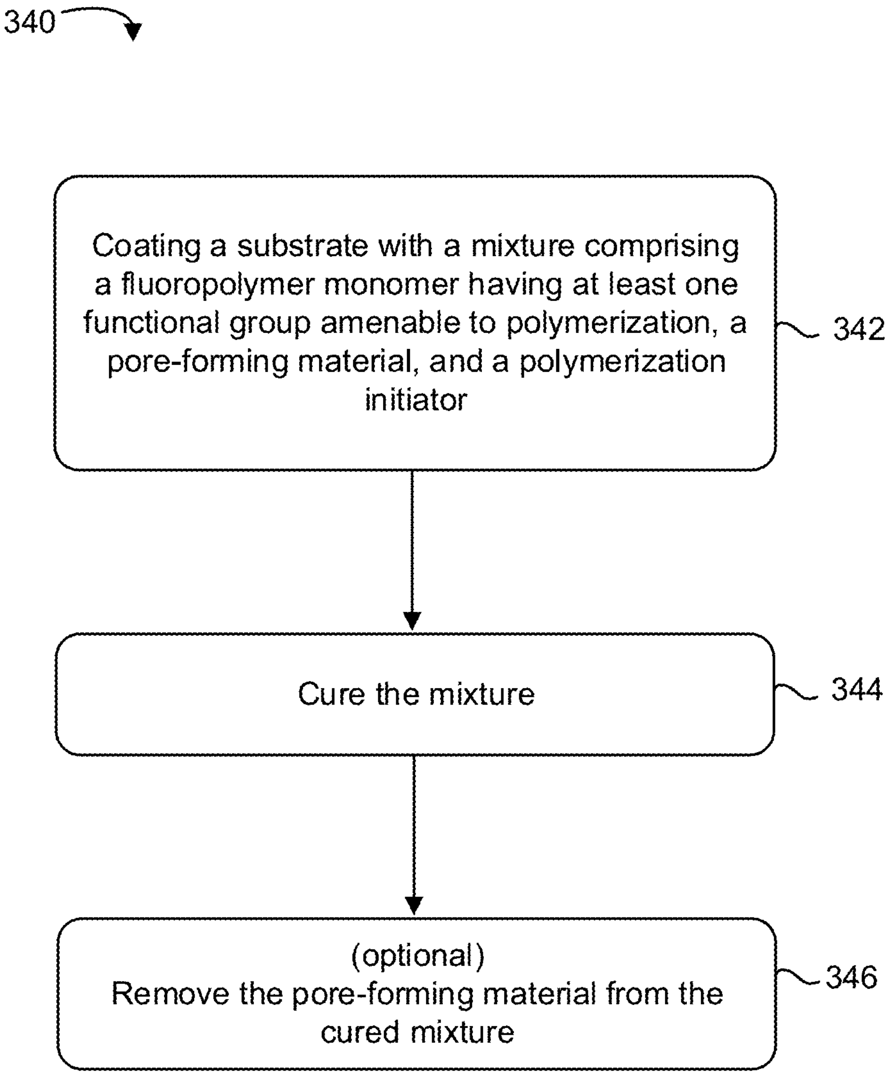
FIG. 3C is a flow chart of a method of forming a three-dimensional structure, according to one embodiment.

FIGS. 3A-3C each show a method 300, 320, 340 for forming a porous, 3D structure as described herein, in accordance with each embodiment. As an option, each of the present methods 300, 320, 340 may be implemented to form structures such as those shown in the other FIGS. described herein. Of course, however, each method 300, 320, 340 and others presented herein may be used to provide applications which may or may not be related to the illustrative embodiments listed herein. Further, the methods presented herein may be carried out in any desired environment. Moreover, more or less steps than those shown in FIGS. 3A-3C may be included in each method 300, 320, 340 according to various embodiments. It should also be noted that any of the aforementioned features may be used in any of the embodiments described in accordance with the various methods.

As shown in FIG. 3A, method 300 of forming a porous, 3D structure includes step 302 of forming a porous fluoropolymer formulation patterned into arbitrary 3D structures via such processing routes as casting, conformal coating, molding and additive manufacturing (3D-printing), spray coating, spray printing, ink jet printing, tape casting, spray cast infusion, doctor blading, roll-to-roll techniques, etc. In some approaches, fluoropolymer formulations may be thermoplastic. For example, fluoropolymer formulations may form a solid from creation of long linear polymer chains. In other approaches, fluoropolymer formulations may be thermoset-forming. For example, fluoropolymer formulations may form a solid from establishing a chemically cross-linked network. During curing, these materials transition from a liquid state to a solid state upon exposure to an external stimulus, for example, but not limited to, thermo-stimuli, photo-stimuli, etc.

In one approach, step 302 includes forming a 3D structure by an additive manufacturing technique using a mixture that includes a fluoropolymer monomer having at least one functional group amenable to polymerization, a pore-forming material, and a polymerization initiator. In various approaches, the mixture includes a fluoropolymer monomer, a non-reactive diluent such as a porogen that is miscible with the fluoropolymer monomer, and a polymerization initiator.

In one approach, a ratio of mixture of component A and component B may be tailored for a process for forming 3D structure to form an aerogel. In various approaches, the forming of a 3D structure by AM results in an engineered 3D structure.

In various approaches, the material can be either thermally cured or actinically cured upon exposure to UV light. The polymerization initiator may be a crosslinking agent, a photoinitiator, a thermal initiator, etc. In one approach, the polymerization initiator is a photoinitiator. In some approaches, the photoinitiator initiates a chemical polymerization process in response to UV irradiation that results in a network of covalently linked reacted fluoropolymer monomer containing unreacted porogen. In one approach, curing by UV light (e.g., actinic curing) entails exposure of the resin to UV light, 405 nm and below, for a duration of 1 to 5 min.

UV-curing of fluoropolymer formulations is advantageous because a) UV-curing is fast on the order of seconds to minutes, and b) light may be used to spatially control curing, such as for 3D printing. However, some UV-cured fluoropolymer formulations tend to have lower gas permeance values compared to thermally cured samples. Gas permeance may be improved by introducing an additional "negative" solvent to the solvent in the mixture of fluoropolymer monomer. A negative solvent is any solvent that is immiscible with the functionalized fluoropolymer monomer. For example, a negative solvent may be added to a mixture having an NMP porogen solvent. An example of a negative solvent includes Triethyleneglycol (TEG) that results in a heterogenous solution with some fluoropolymer monomers. The concentration of the negative solvent may be fine-tuned to give a "cloudy" mixture that may be defined as a stable transition region that separates one-phase and two-phase mixtures. Mixtures including a solvent for dissolving the fluoropolymer monomer (and may be present as a porogen) and a negative solvent are referred to as cloud point formulations and identified at specific locations on a ternary phase diagram (as shown in FIG. 8A).

In one approach, mixtures of functionalized fluoropolymer monomer having cloud-point formulations may be UV-cured within seconds-to-minutes, while maintaining an open pore-morphology with excellent gas permeances similar to values observed in the thermally cured samples. Permeance may be tuned by varying the concentration of functionalized fluoropolymer relative to organic solvent porogen.

In some approaches, the mixture includes a polymerization inhibitor to stop excess photopolymerization of the mixture. In various approaches, the photopolymerization reaction includes crosslinking the fluoropolymer monomers via the radiation-curable functional groups of the fluoropolymer monomers.

In one approach, the polymerization initiator is a thermal initiator. Examples of thermal initiators include di-tert-butyl peroxide, 2,2-azobis(2-methylpropionitirile), lauroyl peroxide, benzoyl peroxide, etc. Examples of actinidic initiators include 1-hydroxy-cyclohexyl-phenylketone, 2-hydroxyl-2-methyl-1-phenyl-1-propane, dimethoxy-phenylacetonphenone, 2-benyl-2-dimethylamino-1-[4-(morpholinyl)phenyl]-1-butanone, phenyl bis(2,4,6-trimethyl benzoyl), etc.

In some approaches, thermal curing typically involves treating the uncured resin at 80° C. for 1 to 4 hours.

In one approach of step 302, the mixture includes a fluoropolymer monomer and a pore-forming material as a non-reactive diluent.

In one approach, the mixture includes a curable resinous material (e.g., a thermoset) that transforms from liquid to a solid during curing. In some approaches, the curing may be a thermal curing that includes heating the mixture to initiate a temperature-induced crosslinking of the fluoropolymer monomer in a network with unreactive porogen. In other approaches, a thermal initiator may be added to the mixture to aid in initiating thermal curing. In yet other approaches, heating during the curing step may accelerate the crosslinking reaction catalyzed by a catalyst.

In other approaches, the curing may be a light-mediated curing step that includes a photoinitiator inducing a crosslinking of fluoropolymer monomers in a network of unreactive porogen in response to UV irradiation. Examples of fluoropolymer monomers having functional groups amenable to photoinitiated polymerization include acrylate, methacrylate, styrene, 1,3-butadiene, etc.

Using additive manufacturing (AM) techniques, step 302 of method 300 allows patterning hierarchical nanoporous fluoropolymer materials. In one approach, the described process forms a fluoropolymer material having high surface area and printed nanoscale features. In various approaches, the architectural features of the formed 3D parts have length scales defined by AM processes to be in a range between 0.1 micron (μm) to greater than 100 μm. The pores formed and defined by the resin mixture used for the AM process may include a length scale of 1 μm and below. In various approaches, the resin mixture is engineered to generate a porosity of the structure through principles of self-assembly and phase segregation.

In various approaches, AM techniques provide control of printing features, ligaments, etc. of 3D structures having length scales in a range between 0.1 μm to greater than 100 μm, and more likely greater than 10 μm.

Further, a UV-curable functionality of the fluoropolymer mixture lends itself to light-driven AM techniques, including projection micro-stereolithography (PμSL) and direct laser writing via two photon polymerization (DLW-TPP). Stereolithography-based AM techniques are notable for high throughput, fine features, and detailed prototyping. Even higher resolution can be achieved with DLW-TPP, which can produce ligaments on the order of 100 nm. In some approaches, light-mediated AM techniques form engineered 3D structures, e.g., gyroids, having nanoporous walls that separate micron-scale channels.

In one approach, the forming of a 3D structure includes an ink-mediated AM technique, e.g., direct ink writing (DIW). The resist mixture including a fluoropolymer monomer, porogen, and polymerization initiator as described herein may be an ink, in which the curing of the mixture is after the formation of the 3D structure by DIW. In contrast to the light-mediated processes of DLW-TPP and PμSL, the material being extruded during the DIW process is self-supporting to form a structure (shear-thinning material). Ink-mediated AM processes tend to be "dry processes," a process that does not involve formation of the 3D structure in a solution. The 3D structure formed by extrusion during DIW is a structure of uncured material. In approaches of forming a structure by DIW, the curing (e.g., polymerization reaction) of the material of the structure may include a thermal curing process, a chemical catalyst, an electrochemical polymerization process, an oxidative process, etc.

Step 304 of method 300 includes curing the formed 3D structure during and/or after the additive manufacturing (AM) technique is performed. In one approach, step 304 of curing the mixture may occur during step 302 of forming the 3D structure using the mixture.

Using light-mediated AM techniques, step 302 of method 300 of forming an engineered 3D structure using the mixture and may include simultaneously forming the 3D structure of step 302 and curing the 3D structure of step 304 by light-mediated AM techniques thereby forming a cured 3D structure. An additional step may include removing the cured 3D structure from a remaining mixture, where the remaining mixture includes uncured components of the mixture.

In various approaches using light-mediated AM techniques, such as PμSL and DLW-TPP technologies, step 302 of forming the engineered 3D structure involves patterned UV-light, so the material is cured during the AM process. The AM process may be performed in a bath of the mixture including fluoropolymer monomer. After formation of the 3D structure, step 302 may additionally include washing away residual uncured mixture from the cured 3D structure. For example, the 3D structure is removed from the bath of the mixture, the "wet" 3D structure is rinsed and/or residual photoresist mixture is wiped away from the cured 3D structure. In some approaches, the 3D structure formed by light-mediated AM processes may include some functional groups that may be subject to additional curing in subsequent steps (e.g., following removal of the pore-forming material).

In another approach, step 304 of curing the mixture may occur following step 302 of forming the 3D structure using the mixture. For example, the structure is formed using an AM technique, e.g., direct ink writing, and the formed structure is then cured.

Illustrative examples of curing the 3D structure may include application of thermal-mediated curing techniques (e.g., placing the 3D structure in an oven), application of UV-irradiation, etc. In approaches where the structure is formed by light-mediated AM techniques and substantially all uncured resist mixture has been removed, step 304 may be a second curing of the material of the formed 3D structure. In other approaches, where the structure is formed by ink-mediated AM techniques (e.g., via a nozzle), step 304 may be a first curing of the material of the formed 3D structure.

In some approaches, the cure profile, e.g., thermal, UV, etc., may provide a means for tuning the microstructure. For example, in some approaches using the light-mediated AM process to form a 3D structure, an additional thermal cure of the 3D structure formed with the photoresist resin may result in a "string of pearls" morphology of particles in the 3D structure. In other approaches using the light-mediated AM process to form a 3D structure, an additional UV-cure of the 3D structure formed with the photoresist resin that includes a UV initiator may result in a more fractal-like network having finer particles and smaller pores. Without wishing to be bound by any theory, it is believed that the curing of step 304 (e.g., by UV irradiation) increases crosslinking of the monomers of the structure and thus may result in increased mechanical strength.

In some approaches, curing may be mediated by thermal-mediated curing. In various approaches, thermal curing is not location selective and thus thermal curing is preferably used in combination with AM methods that control the morphology of the printed structure by non-thermal mediated means (e.g., with light in the case of PμSL or nozzle location in the case of DIW).

According to various approaches, a polymerization inhibitor is critical for forming a porous 3D structure. In one approach, the concentration of inhibitor is a critical parameter for controlling the porosity and mass and/or density of printed materials. In one approach, the concentration of inhibitor in the resin mixture is a critical parameter for tuning the porosity and mass and/or density of printed materials. In some approaches, the mixture may include an effective amount of polymerization inhibitor for forming a porous 3D structure. The effective amount of polymerization inhibitor is an amount that imparts the desired function or result, and may be readily determined without undue experimentation following the teachings herein and varying the concentration of the additive, as would become apparent to one skilled in the art upon reading the present description.

In various approaches, the concentration of inhibitor for a mixture used in forming a 3D structure by AM techniques may be in a range of greater than 0.05 wt % to about 3.5 wt % of total mixture. In one exemplary approach, the concentration of polymerization inhibitor may be in a range of greater than about 0.25 wt % to about 3.5 wt % of total mixture but could be higher or lower.

Optionally, in some approaches, method 300 includes a step 306 of removing the pore-forming material from the cured structure. In this approach and others described herein, removing the pore-forming material from the cured structure is intended to include removal of a pore-forming material (e.g., porogen) and/or removal of the pore-forming reaction product of a pore-forming substance. For simplicity and clarity, much of the following discussion refers to porogens. It should be kept in mind that the various techniques described herein for removing pore-forming materials (e.g., porogens) may be used to remove the pore-forming reaction product of a pore-forming substance.

Removing a porogen (or equivalently the pore-forming reaction product of a pore-forming substance, per the previous paragraph) from the cured structure may result in interconnected pores through the structure. In one approach, the pores may be interconnected from the surface of one side of the 3D structure to the opposite surface of the structure in a longitudinal direction across the structure.

In one approach, extraction, removal, etc. of the pore-forming material (e.g., porogen) includes removing the porogen using a solvent exchange method. In one approach, the porogen polyethylene glycol may be exchanged with acetone, water, etc. In one approach, porogen may be removed by dissolution of the porogen into a co-solvent.

In some approaches, the extracting of the porogen may include methods of solvent exchange. In some approaches using light-mediated AM techniques, some of the initial porogen may have been exchanged with solvent during the removing of uncured mixture from the structure. In some approaches, step 306 may be repeated several times to remove substantially all of the porogen by exchanging the porogen with solvent. In various approaches, step 306 results in a wet 3D structure having pores filled substantially with solvent where the pores were prior filled with porogen.

Various methods as understood by one skilled in the art may be employed to remove the pore-forming material. Various examples include, and are not meant to be limiting, removing the pore-forming material by solvent exchange, super-critical extraction, etc. In one exemplary approach, the extraction of a porogen includes removing the porogen using a solvent exchange method.

In some approaches, the porogen may be removed from the 3D structure. For example, using a mixture having 80 wt. % fluoropolymer monomer and 20 wt. % porogen, the porogen may be present in low concentrations that prevent removal of the porogen from the material, and thus, the resulting material may not have interconnected pores.

In some approaches, the porogen (or more typically the equivalent pore-forming reaction product of a pore-forming substance) may be a gaseous component, and thus the porogen may simply be allowed to dissipate via the pores of the cured structure.

In some approaches, the cured structure is dried. Conventional drying techniques may be used, including drying at ambient temperatures, drying at elevated temperatures, supercritical drying, etc. Following exchange of substantially all porogen of step 306, the wet 3D structure may be dried. In preferred approaches, the nanoporosity of the material of the 3D structure is maintained during supercritical drying step. The dry 3D structure may only be formed after removing the solvent that fills both kinds of pores which is typically done by supercritical drying although air drying might work as well if the structure is mechanically strong enough. In some approaches, drying may include methods of supercritical drying, lyophilization, evaporation, etc. to dry the wet 3D structure.

In one embodiment a method 320, as shown in FIG. 3B, of forming a porous 3D structure may include steps that begin with step 322 of placing the mixture comprising a fluoropolymer monomer having at least one functional group amenable to polymerization, a pore-forming material and a polymerization initiator in a shaping object. In one approach, the shaping object may be a cast. In another approach, the shaping object may be a mold. These are examples only and are not meant to be limiting in any way.

Similar to method 300 of FIG. 3A, method 320 includes step 324 of curing the mixture in the shaping object after step 322 of placing the mixture in the shaping object. In one approach, curing the shaped object of mixture may include UV-mediated techniques where the polymerization initiator is a photoinitiator. In another approach, the shaped object of mixture may be cured by thermal-mediated techniques where the polymerization initiator is a thermal initiator.

In one approach, method 320 includes an additional step 326 of removing the pore-forming material from the cured mixture. Techniques for removing the pore-forming material are described herein and depend on the pore-forming material (e.g., porogen or pore-forming substance) present in the material. In one approach, where the pore-forming material is gaseous, the pore-forming material may be allowed to simply dissipate via the formed pores.

According to one embodiment, a method 340 of forming a porous 3D structure, as shown in FIG. 3C, includes step 342 of coating a substrate with a mixture that includes a fluoropolymer monomer having at least one functional group amenable to polymerization, a pore-forming material, and a polymerization initiator. In various approaches, different pore structures may be created in the material using different reactivities. In addition, different curing methods of the mixture on the substrate may generate predefined pore structures. For example, a surface of fluoropolymer material may have a pore structure comprising discrete surface pores or an open mesh-type surface. In various approaches, the porosity of the structure may be defined by conditions of the reaction, for example, temperature, light intensity, substrate upon which the material is cured, etc.

Following the coating of a substrate, method 340 includes step 344 of curing the mixture. In one approach, curing the coating may include UV-mediated techniques where the polymerization initiator is a photoinitiator. In another approach, the coating may be cured by thermal-mediated techniques where the polymerization initiator is a thermal initiator.

In one approach, method 340 includes an additional step 346 of removing the pore-forming material from the cured coating mixture. Techniques for removing the pore-forming material are described herein and depend on the pore-forming material (e.g., porogen) present in the material. In one approach, where the pore-forming material is gaseous, the pore-forming material may be allowed to simply dissipate via the formed pores.

According to various embodiments, a fluoropolymer resin has been formulated for forming a 3D structure by additive manufacturing. The methods described herein may generate well-defined and highly porous (e.g. to the sub-micron level) structures by porogen leaching. The resulting well-defined nano-porous polymer framework may be carbonized into carbon aerogels.

In one embodiment, a product includes a porous 3D structure including a crosslinked fluoropolymer where at least 20% of a volume measured withing an outer periphery of the porous three 3D structure corresponds to the pores. In other words, less than 80% of a volume measured according to the outer dimensions of the 3D structure may be material and at least 20% of the volume is void space. In one approach, at least 50% of the volume measured according to outer dimensions of the porous three-dimensional structure corresponds to the pores. In other words, less than 50% of a volume measured according to the outer dimensions of the 3D structure may be material and at least 50% of the volume is void space.

In one embodiment, a product includes a porous 3D structure formed by additive manufacturing, where the three-dimensional structure has ligaments (e.g., features, structural components, etc.) arranged in a geometric pattern where the ligaments define pores therebetween. In some approaches, the porous 3D structure has hierarchical porosity such that the porosity of the structure formed by the additively manufactured ligaments is macro or mesoporous, where the ligaments themselves are formed of nanoporous material.

Figure 4A:
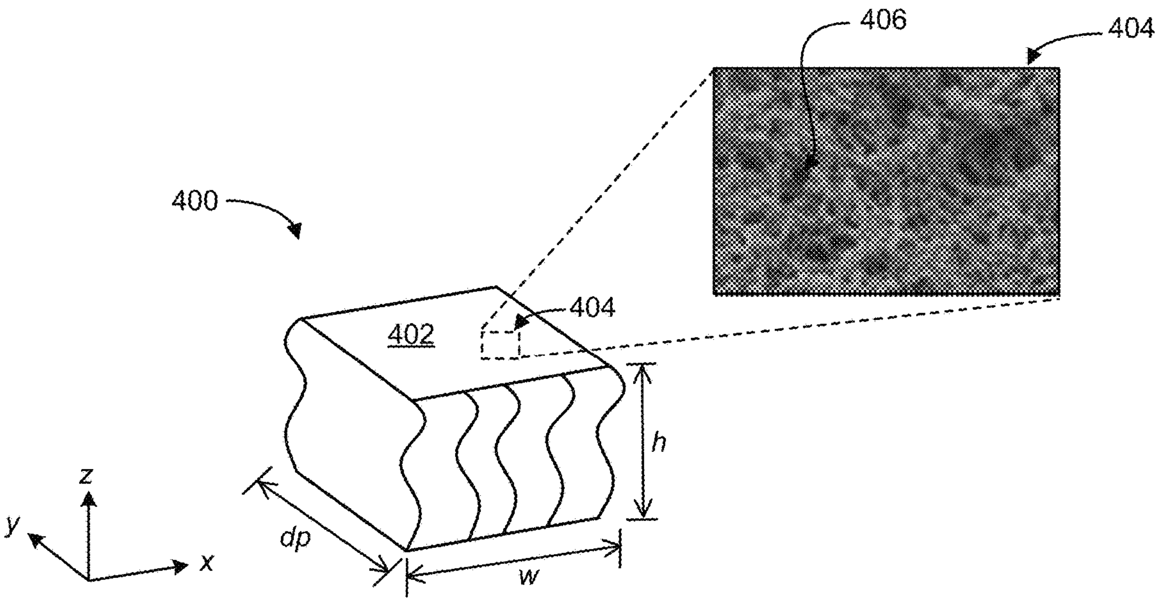
FIG. 4A is a schematic drawing of a porous three-dimensional structure, according to one embodiment.
Figure 4B:
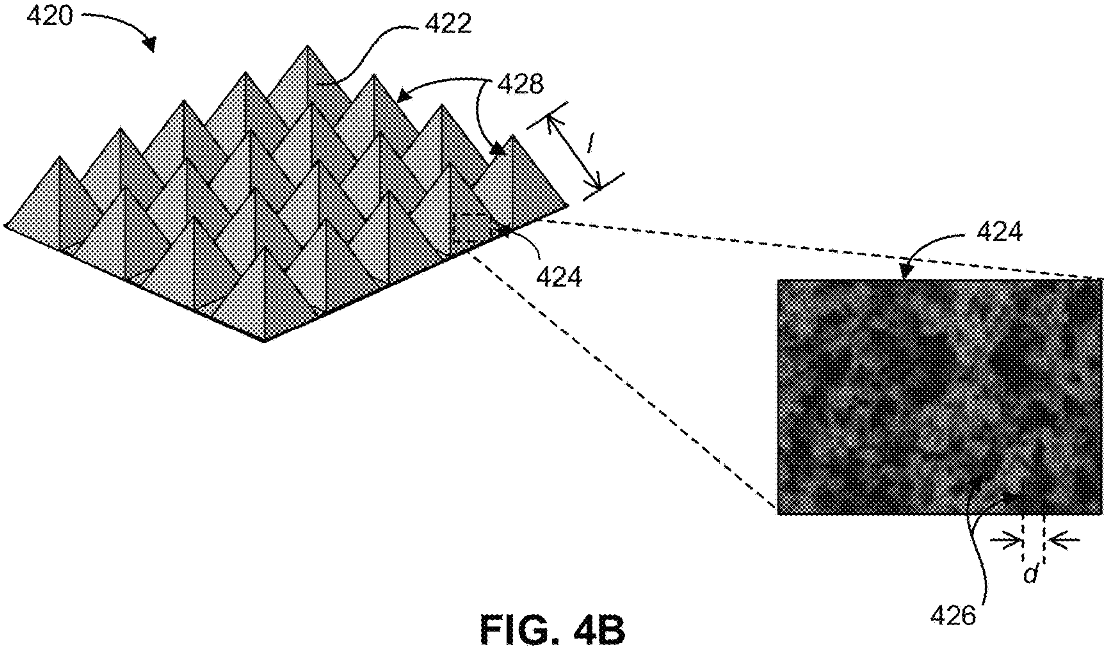
FIG. 4B is a schematic drawing of a porous three-dimensional structure having a geometric shape, according to one embodiment.

FIGS. 4A-4B each depict a porous, 3D structure 400, 420, in accordance with various embodiments. As an option, each present structure 400, 420 may be implemented in conjunction with features from any other embodiment listed herein, such as those described with reference to the other FIGS. Of course, however, each such structure 400, 420 and others presented herein may be used in various applications and/or in permutations which may or may not be specifically described in the illustrative embodiments listed herein. Further, each structure 400, 420 presented herein may be used in any desired environment.

As shown in FIG. 4A, a porous 3D structure 400 is fabricated from a material 402 having a crosslinked fluoropolymer. The material 402 has a series of pores 406 as shown in the magnified view of a portion 404. Further, at least 20% of a volume measured within the outer periphery of the porous 3D structure 400 corresponds to the pores 406. As an example, the outer periphery is determined by the outer dimensions of the 3D structure 400 and may be measured hypothetically by wrapping the 3D structure 400 with a film and then measuring the outer dimensions of the structure that now appears to be monolith structure, in which a height h may be measured in the z direction, a width w may be measured in an x direction, and a depth dp may be measured in a y direction. Thus, the volume of the 3D structure 400, $V_{400}$, may be calculated as $V_{400}=w\cdot h\cdot dp$.

An example of such a porous 3D structure 420 comprised of a material 422 having fluoropolymer includes ligaments 428 (e.g., features, filaments, etc.) arranged in a geometric pattern as shown in FIG. 4B. In some approaches, the ligaments 428 of the 3D structure are nanoporous, as shown in the magnified view of portion 424. In some approaches, the average diameter d of the pores 426 may be greater than 100 nanometers (nm). In some approaches, the average diameter d of the pores 426 may be greater than about 1 μm.

In some approaches, the average length scale l of the ligaments 428 may be greater than 100 nm, as shown in FIG. 4B. An average diameter of the ligaments may be in a range of about 1 μm to about 1000 μm. In various approaches, the 3D structure has porosity where the pores within the geometric pattern have an average diameter greater than about 10 μm. In some approaches, the 3D structure may be mesoporous. In some approaches, the 3D structure may be macroporous.

In one approach, the geometric pattern of the 3D structure determines the mechanical properties and preferably provides channels to direct mass transport through the structure, according to the AM process used to form the porous 3D structure. The initial presence of component B, e.g., porogen, in the resist mixture provides porogen-induced nanoporosity of the structure thereby resulting in increased surface area for a given volume of material.

In some approaches, the product as described herein includes a surface area of the three-dimensional structure in a range of about 1 $m^2/g$ to about 100 $m^2/g$ of bulk fluoropolymer material. For structures formed by AM techniques, the surface area of the printed 3D structure may be higher than a monolith structure of similar fluoropolymer material, e.g., greater than 100 $m^2/g$.

In various approaches, the polymer 3D structure formed by additive manufacturing has hierarchical porosity, where the structure of the product is a lattice providing channels between the beams of the lattice. The plurality of pores within the beams of the lattice, e.g., the porous material used to print the lattice structure, provide an additional level of porosity to the structure. The outer dimensions of the structure, e.g., lattice formation, provide a measurement of the volume of the structure, of which at least 20% is void space. In some approaches, the outer dimensions of the structure provide a measurement of the volume of the structure, of which at least 50% is void space. In addition, the geometric pattern of the structure generates increased surface area compared to a monolithic structure having similar volume dimensions.

In one approach, the porous 3D structure is hydrophobic. The porous 3D structure is characterized by allowing passage of gases therethrough and repelling at least liquid water from passage therethrough.

In one approach, the fluoropolymer monomer may include additional functional groups to improve functionality of the fluoropolymer material of the formed porous 3D structure. In one approach, the fluoropolymer has functional group along a backbone thereof. As described herein, for example, a charged cationic species may be included for conducting negatively charged ions. In another example, carbon dioxide capturing groups may be added to enhance carbon capture. These approaches are examples only and are not meant to be limiting in any way.

In various embodiments, each 3D additive manufacturing process (e.g., DLW-TPP, PμSL, DIW, etc.) allows an engineered structure having a geometric pattern, e.g., gyroid structures. According to various approaches, the engineered structure may include nano-porous walls that separate micron-scale channels. In other words, the spacing between the porous features of the structure may be inner channels having an average diameter in the microscale. The inner channels may extend along the length of the structure in a longitudinal direction thereof.

According to various embodiments described herein, porous, 3D fluoropolymer material may be fabricated with engineered hierarchical structures that include a digitally engineered macroporous system for fast mass transport and mechanical strength, and nanopores for high surface area.

Experiments

Two resin systems were fabricated, porous fluoropolymer resin system 1 and 2 (PFPRS1 and PFPRS2) according to various embodiments described herein. Both PFPRS1 and PFPRS2 rely on functionalized perfluoropolyether monomers, as shown in FIG. 2. PFPRS1 utilizes an actinic or thermal activated initiated free-radical acrylate polymerization to cure the material from a low viscosity liquid into an intractable solid. PPRPRS2 utilizes actinic or thermal activated initiated free-radical chemistry to drive thiol+olefin curing reactions.

In both instances, the functional monomers in PFPRS1 and PFPRS2 are dissolved in a non-reactive solvent that also served as a porogen. The organic solvent porogens was removed via solvent exchange in acetone over a duration of 24 hours. Acetone was then removed from the material via $CO_2$ supercritical drying. $CO_2$ supercritical drying was deemed necessary to preserve pore morphology.

For PFPRS1, 4 grams of MD700 (obtained from Solvay Inc, WV, USA) was mixed with 6 grams of NMP to give a mixture of 40 wt. % MD700 fluoropolymer. To this mixture was added 1 wt. % initiator. The initiator species may be either thermally or actinically activated and was chosen based on the desired curing protocol. The fluoropolymer resin mixture was then poured into a simple mold having a 0.3 mm rubber gasket sandwiched between two glass slides. The material was then cured, via thermal processing or UV-irradiation depending on the application, to give a wet, opaque gel. The free-standing gelled material was then removed from the glass-slide mold and placed in a beaker of acetone for 24 hours for solvent exchange to replace the NMP porogen with acetone. Next, the acetone-saturated gel was dried using $CO_2$ supercritical drying techniques to result in a free-standing visually white, porous film as shown in the image of FIG. 5A.

The image of FIG. 5B depicts a water contact image between the fluoropolymer film depicted in FIG. 5A and a 10 μl droplet of water, showing a 130° contact angle.

As shown in FIGS. 5C and 5D, different cure profiles resulted in different micro-structures of the 3D structure. FIG. 5C depicts a scanning electron microscope image of a 40 wt. % PFPRS1 (40 wt. % reactive fluorinated monomer relative to porogen solvent) thermally cured at 80° C. for a duration of 1 hour. Thermal curing, as shown in the low magnification SEM image part (a) (scale bar refers to 10 μm) and magnified view in part (b) (scale bar refers to 1 μm) formed a "string of pearls" morphology. The size of particles following thermal curing had an average diameter of approximately 100 to 500 nm.

FIG. 5D depicts SEM images of 40 wt. % PFPRS1 UV-flood cured under 5 $mW/cm^2$ 365 nm light for a duration of 5 min. The UV curing formed a more fractal-like network of much finer particles and smaller pores. The image of part (b) is a magnified view of a portion of the image in part (a). Scale bars are similar to corresponding images of FIG. 5C.

FIG. 5E is a graph of nitrogen gas (N2) permeance for a series of commercial expanded teflon material (ePTFE) (striped bars) and a series of PFPRS1 materials cured under UV and thermal conditions (solid black bars). Measuring N2 permeance is a normalized way to account for the gas flow through a sample. N2 gas is applied to each sample of material at a certain pressure, then on the opposite side, the amount of gas flowing through the material is measured. Thus, the greater or more interconnected the void space, the higher the permeance. The cure mechanism, thermal vs UV, resulted in differing pore morphologies and remarkably different gas permeance values. Without wishing to be bound by any theory, it is believed that in some combinations of fluoropolymer monomers and solvent, thermally cured samples may have larger pores and gas permeance values nearly three orders of magnitude greater than UV-cured samples. Other combinations of a fluoropolymer monomer and solvent may generate porosities to a different extent for thermally-cured samples versus UV-cured samples. Thermally cured PFPRS1 (solid bars, Thermal) resulted in films with gas permeances similar to that of commercial grade ePTFE (striped bars).

Figure 6:
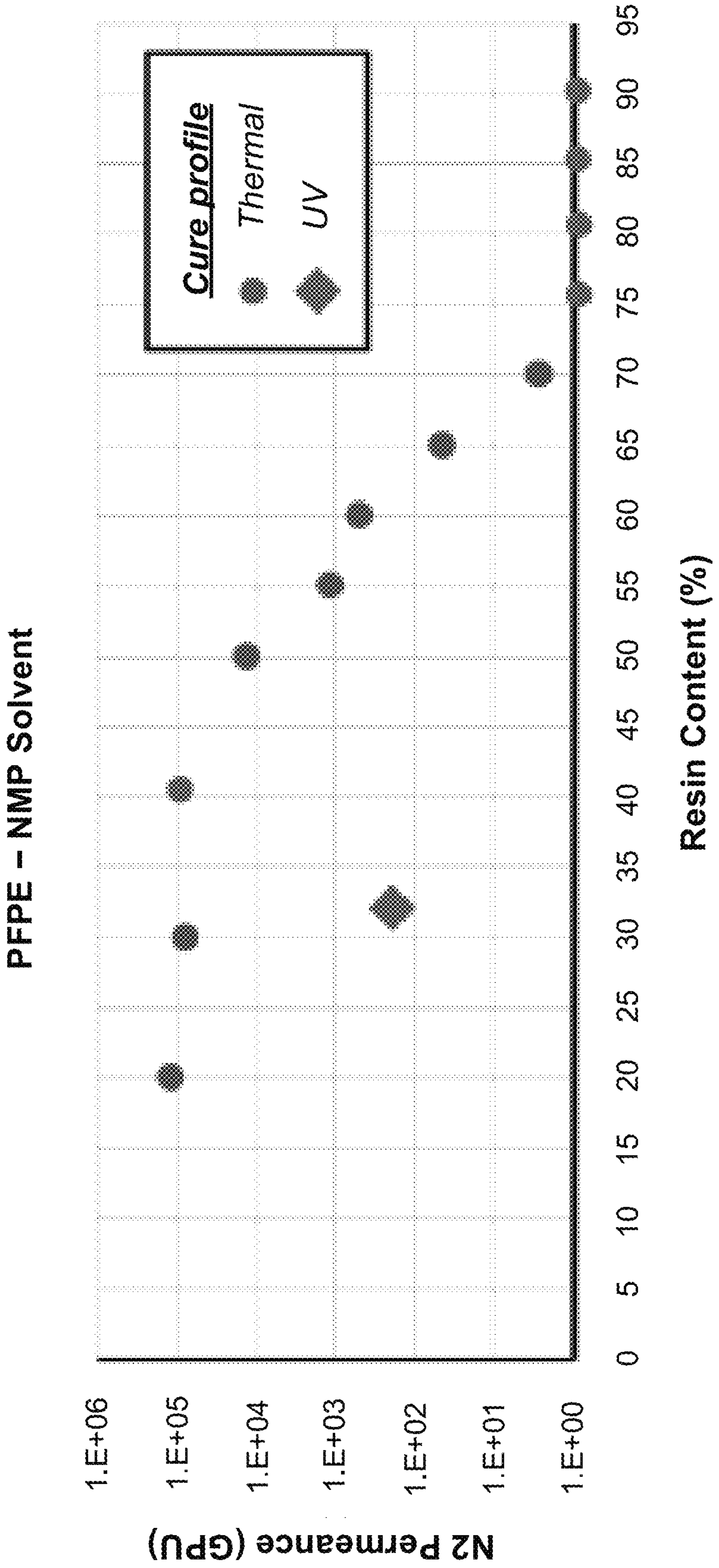
FIG. 6 is a plot of $N_2$ permeance as a function of fluorinated resin content, according to one embodiment.

FIG. 6 is a plot of $N_2$ permeance values as a function of fluorinated resin content (wt. %) relative to organic solvent porogen. Thermal cure refers to 80° C. for 1 hour. UV cure refers to UV-flood cure for under 5 mW/cm$^2$ 365 nm light for a duration of 5 min. Permeance decreased as the ratio of fluoropolymer to porogen solvent increased. Thus, permeance was tuned by varying the concentration of fluoropolymer relative to porogen solvent.

Figure 7:
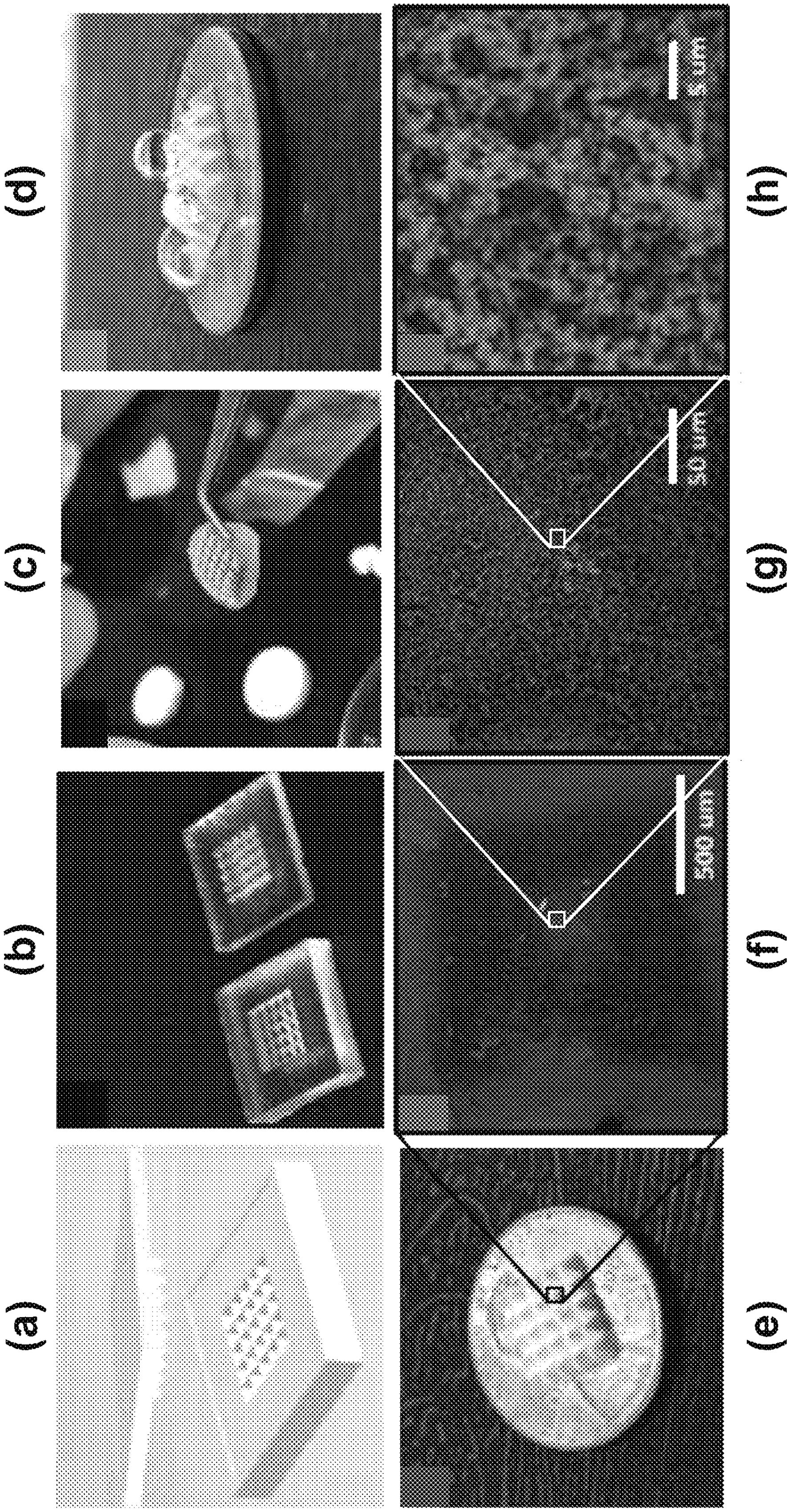
FIG. 7 are images of porous fluoropolymer resin material being cast into complex shapes, according to one embodiment. Part (a) depicts a STL model of a mold, part (b) depicts a 3D printed mold, part (c) depicts a "wet" fluoropolymer gel after polymerization and release from the mold, prior to drying, part (d) depicts a dried fluoropolymer material with beads of water. Part (e) depicts the dried fluoropolymer, Parts (f), (g), and (h) are scanning electron micrograph images of portions of the dried fluoropolymer having increasing magnification for each image.

The series of images in FIG. 7 demonstrates the fabrication of a porous 3D structure arranged in a geometric pattern (parts (a) to (d)). Further, the pores of the features have an average diameter of less than 200 nm (parts (e) to (h)). FIG. 7 depicts an example of PFPRS1 being cast into a complex shape of twenty-five 1×1 mm$^2$ pyramids using a pyramid mold. Part (a) is an image of a standard triangle language (STL) model of a mold. Part (b) depicts the image of the resulting 3D printed mold including 25 pyramids fabricated out of silicone.

PFPRS1 was cast in between the molds and cured at 80° C. for 2 hours using a lauroyl peroxide as the thermal initiator. Removal of the mold and acetone exchange of the 3D structure resulted the "wet" fluoropolymer gel as shown in part (c), the 3D structure after polymerization and release from mold, prior to drying. Subsequent $CO_2$ super-critical drying yielded a complex 3D fluoropolymer part as shown in the image of part (d). In addition, the image of part (d) shows the hydrophobicity of the part as indicated by the beads of water perched on top of the dried fluoropolymer 3D structure.

Parts (e) to (h) are SEM images of portions the dried fluoropolymer 3D structure at successive magnifications. Part (f) scale bar is 500 μm, part (g) scale bar is 50 μm, and part (h) scale bar is 5 μm.

To overcome the inhibited use of UV-cured PFPRS1 in various fabrication methods such as 3D-printing via stereolithography, a negative solvent Triethyleneglycol (TEG) was added to PFPRS1 to form heterogenous solutions. The concentration of TEG was fine-tuned to give a "cloudy" mixture that may be defined as a stable phase that exists on the edge of phase separation. These mixtures are referred to as cloud point formulations and identified at specific locations on a ternary diagram.

As shown in FIG. 8A, a ternary phase diagram may be used to predict complex solution behavior resulting from the addition of a negative solvent, triethylene glycol, to a homogenous PFPRS1 resin (MD700+Irgacure 1173) dissolved in NMP solvent. The oval region (dark gray) represents the set of exemplary compositions to yield porous self-supporting films. The light gray shaded region represents the composition space that would likely yield one phase solutions (e.g., a homogenous solution). The striped region represents the composition space that would likely yield two phases when mixed (e.g., phase-separated solutions), the data points (●) predict cloud-point solutions.

The photograph image of FIG. 8B depicts a cloud-point solution prior to curing.

FIG. 8C depicts a graph of the $N_2$ permeance values for a 40 wt. % PFPRS1 resin with (Cloud-Point) the addition of triethylenegylcol (TEG) or without (Homogeneous). Curing entailed UV-flood under 5 mW/cm$^2$ 365 nm light for a duration of 5 min.

FIG. 8D is an SEM images of a cross-section of a 250 μm cloud-point, UV-cured PFPRS1, scale bar corresponds to 100 μm. FIG. 8E is an SEM image of a magnified region of a cloud-point, UV-cured PFPRS1 sample, scale bar corresponds to 1 μm.

Figure 9:
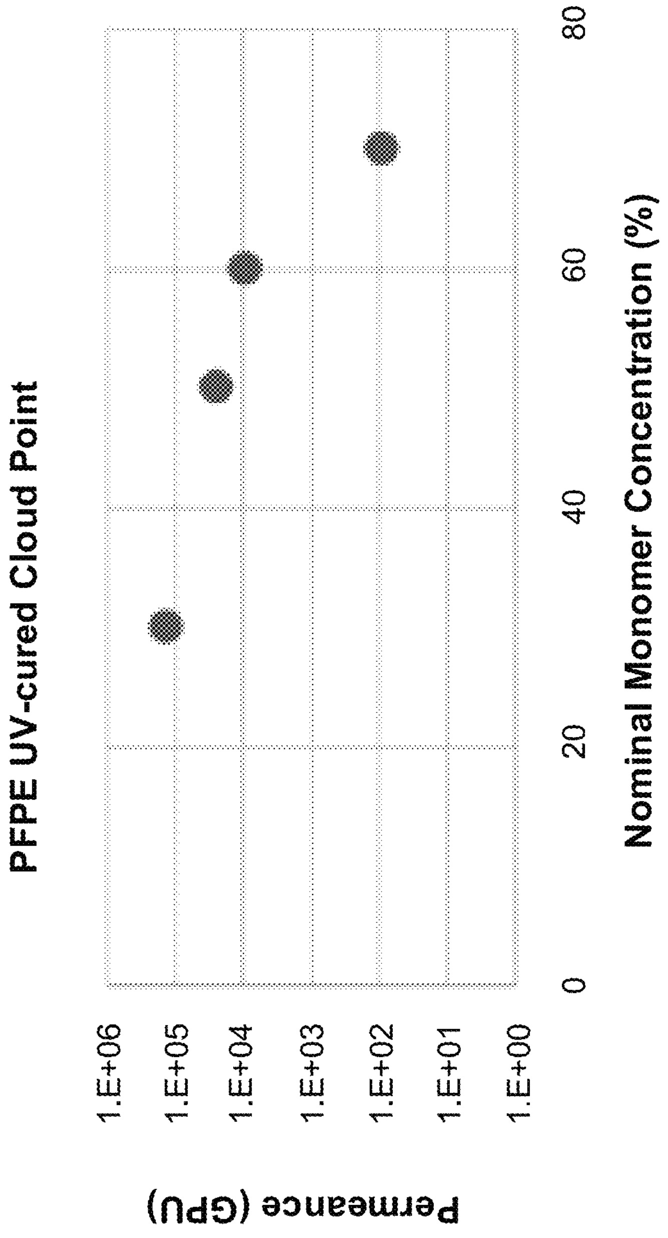
FIG. 9 is a plot of N2 permeance as a function of fluoropolymer monomer concentration in cloud-point porous fluoropolymer resin materials, according to one embodiment.

PFPRS1 cloud-point formulations were UV-cured within seconds-to-minutes, while maintaining an open pore-morphology with excellent gas permeances similar to values observed in the thermally cured samples as shown in FIG. 9. Permeance was tuned by varying the concentration of functionalized fluoropolymer relative to organic solvent porogen. $N_2$ permeance values for cloud-point samples as a function of fluorinated resin content (wt. %) relative to organic solvent porogen. Cloud-point samples were UV-flood cured under 5 mW/cm$^2$ 365 nm light for a duration of 5 min.

Figure 10A:
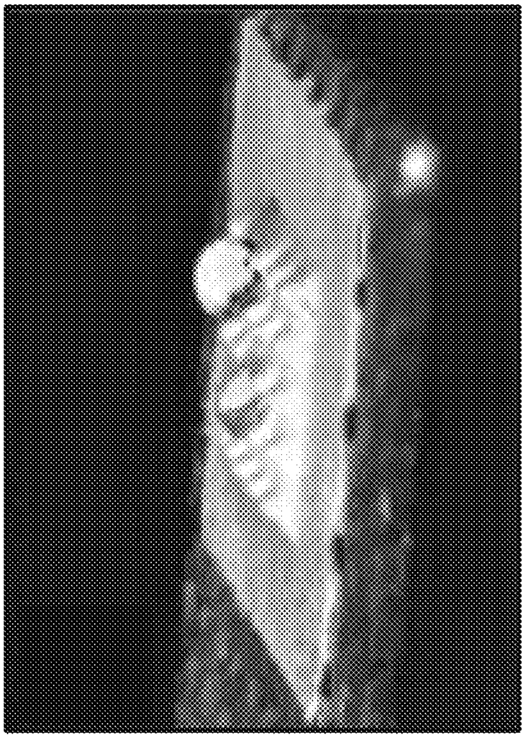
FIGS. 10A and 10B are images of 3D-printed, 40 wt. % cloud-point porous fluoropolymer resin materials, according to one embodiment.
Figure 10B:
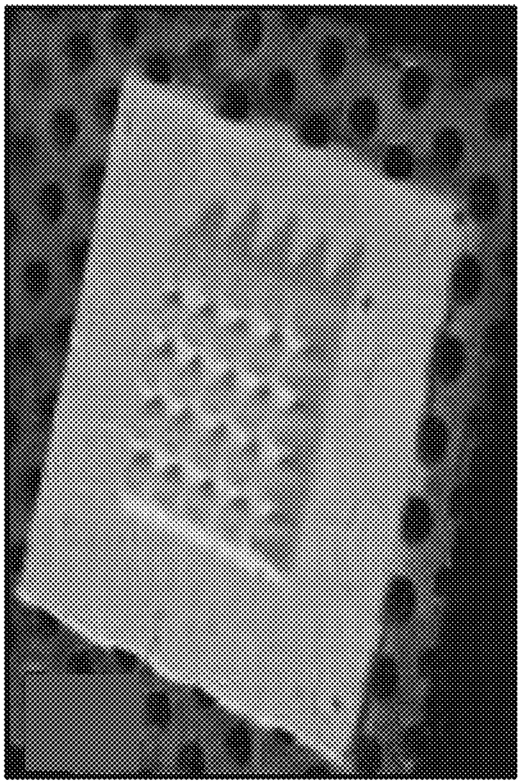
Figure 10C:
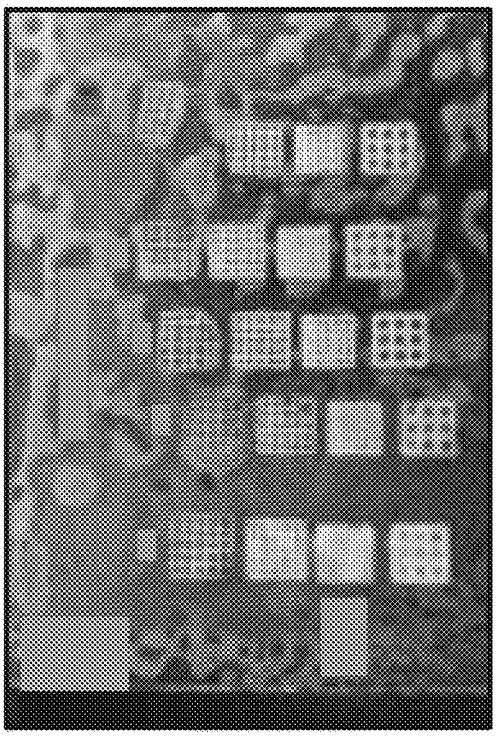
FIG. 10C is an image of a series of 3D printed porous fluoropolymer structures under varying print conditions for an XY grid, according to one embodiment.
Figure 10D:
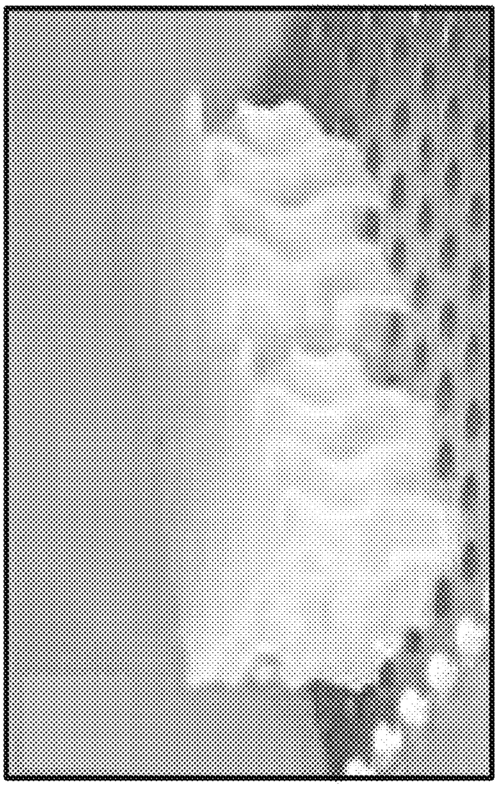
FIG. 10D is an image of a 3D-printed gyroid lattice of porous fluoropolymer material, according to one embodiment.

PFPRS1 cloud-point formulations can be 3D printed using stereolithography techniques as shown in FIGS. 10A-10D. PFPRS1 including NMP and TEG was combined with phenyl bis(2,4,6-trimethyl benzoyl), 4-methoxyphenol and a photosensitizer and printed using DLP-SLA (digital light projector-stereolithography) at 405 nm. FIGS. 10A and 10B depict photographic images of 3D-printed 40 wt. % cloud-point PFPRS1 using projection micro-stereolithographic (PμSL) printers. FIG. 10C is an image depicting a dose under varying print conditions for an XY-grid. FIG. 10D is an image of 3D-printed gyroid lattice.

In Use

According to various embodiments, fluoropolymer materials as described herein are a commercially important class of materials most notable for their 'non-stick' and friction reducing properties. In addition, fluoropolymers display excellent resistance towards corrosive chemicals, have excellent mechanical properties, good high temperature performance and outstanding dielectric strength.

In general, the porous fluoropolymers may be used for any known product or in any known process in which ePTFE is used.

Moreover, fluoropolymer materials as described herein have a microporous structure with significant amount of air or void space. The microporosity of the material enables gas transport and further increases the dielectric strength of porous fluoropolymers, much like ePTFE. Moreover, various embodiments of the underlying fluoropolymer matrix retain the ability to repel liquids, e.g., water, etc. while being capable of transporting gases (including such as water vapor).

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. A mixture, comprising:

a perfluoropolyether monomer having at least one functional group amenable to polymerization, wherein an amount of the perfluoropolyether monomer is in a range of greater than 20 weight % to about 95 weight % of the total weight of the mixture, wherein the perfluoropolyether monomer is the only monomer in the mixture;

a pore-forming material;

a polymerization initiator; and a polymerization inhibitor.

2. The mixture as recited in claim 1, wherein the perfluoropolyether monomer has an average atomic weight percentage of fluorine in a range of 10% to 90%.

3. The mixture as recited in claim 1, wherein the mixture is a liquid.

4. The mixture as recited in claim 1, wherein the pore-forming material is a porogen.

5. The mixture as recited in claim 4, wherein the porogen is a non-reactive component.

6. The mixture as recited in claim 4, wherein the porogen is a liquid solvent.

7. The mixture as recited in claim 4, wherein the porogen is a solid component.

8. The mixture as recited in claim 4 wherein the porogen is a gaseous component.

9. The mixture as recited in claim 1, wherein the pore-forming material is a pore-forming substance that assists in generating gaseous species during curing.

10. The mixture as recited in claim 1, wherein the mixture has a viscosity in a range of 0 cP to about 100,000 cP.

11. The mixture as recited in claim 1, comprising less than 5 wt % of an additive selected from the group consisting of: nanoparticles, a catalyst, and an electron conductor.

12. The mixture as recited in claim 1, wherein the perfluoropolyether monomer has at least two functional groups thereon.

13. The mixture as recited in claim 1, wherein a concentration of the pore-forming material in the mixture is in a range of greater than 0 wt % to about 98 wt % of total mixture.

14. The mixture as recited in claim 1, wherein the polymerization initiator is selected from the group consisting of: a photoinitiator and a thermal initiator.

15. The mixture as recited in claim 1, wherein a concentration of the polymerization inhibitor is in a range of greater than 0.05 weight % to about 3.5 weight % of total mixture.

16. The mixture as recited in claim 1, further comprising a negative solvent that is different than the pore-forming material, wherein the negative solvent is immiscible with the perfluoropolyether monomer.

17. The mixture as recited in claim 1, wherein the mixture consists essentially of the perfluoropolyether monomer, the pore-forming material, the polymerization initiator, and the polymerization inhibitor.

18. The mixture as recited in claim 1, wherein the perfluoropolyether monomer includes at least two acrylate functional groups that are capable of homo-polymerization.

19. The mixture as recited in claim 1, wherein the perfluoropolyether monomer has at least two functional groups amenable to polymerization, wherein the perfluoropolyether monomer is amenable to polymerization in response to actinic radiation and the perfluoropolyether monomer is amenable to polymerization in response to thermal energy.

20. The mixture as recited in claim 19, wherein the polymerization initiator includes a photoinitiator and a thermal initiator.

* * * * *